US008681657B2

(12) United States Patent
Higuchi et al.

(10) Patent No.: US 8,681,657 B2
(45) Date of Patent: Mar. 25, 2014

(54) NETWORK MANAGEMENT SYSTEM AND MANAGEMENT COMPUTER

(75) Inventors: Hidemitsu Higuchi, Ebina (JP); Tomoyuki Iijima, Tokyo (JP); Makoto Kitani, Yokohama (JP)

(73) Assignee: Alaxala Networks Corporation, Kawasaki (JP)

( * ) Notice: Subject to any disclaimer, the term of this patent is extended or adjusted under 35 U.S.C. 154(b) by 97 days.

(21) Appl. No.: 13/486,646

(22) Filed: Jun. 1, 2012

(65) Prior Publication Data

US 2013/0010640 A1   Jan. 10, 2013

(30) Foreign Application Priority Data

Jul. 4, 2011   (JP) ................................. 2011-148173

(51) Int. Cl.
*H04L 12/28* (2006.01)

(52) U.S. Cl.
USPC ........................................................ 370/254

(58) Field of Classification Search
None
See application file for complete search history.

(56) References Cited

U.S. PATENT DOCUMENTS

| 7,796,614 | B1 * | 9/2010 | Weymans ..................... 370/396 |
| 2002/0032761 | A1 * | 3/2002 | Aoyagi et al. ................ 709/223 |
| 2005/0213504 | A1 * | 9/2005 | Enomoto et al. .............. 370/235 |
| 2010/0054250 | A1 * | 3/2010 | Kitamura et al. ............. 370/392 |
| 2010/0098082 | A1 * | 4/2010 | Sampath et al. .............. 370/392 |
| 2011/0058560 | A1 * | 3/2011 | Okita et al. ............... 370/395.53 |
| 2011/0113472 | A1 * | 5/2011 | Fung et al. ........................ 726/3 |
| 2011/0205904 | A1 * | 8/2011 | Nakagawa .................... 370/241 |

FOREIGN PATENT DOCUMENTS

JP   2008-219531 A   9/2008

* cited by examiner

*Primary Examiner* — Asad Nawaz
*Assistant Examiner* — Parth Patel
(74) *Attorney, Agent, or Firm* — Foley & Lardner LLP

(57) ABSTRACT

Provided is a network management system for managing a plurality of packet relay devices, the network management system comprising: the plurality of packet relay devices constituting networks; and a display device for displaying configurations of the networks, in a case where it is determined that a virtual packet relay device identifier of the virtual packet relay device that is assigned a second-network identifier associated with the extracted second-network identifier is registered in a first-network configuration table, a first-work identifying module is configured to associate a first-network identifier that is associated with the virtual packet relay device identifier with the obtained configuration information, and register the association between the first-network identifier and the obtained configuration information in the first-network configuration table.

12 Claims, 23 Drawing Sheets

FIG. 4

CONFIGURATION MANAGEMENT DATABASE

| PACKET RELAY DEVICE IDENTIFIER | VIRTUAL PACKET RELAY DEVICE IDENTIFIER | VLAN ID |
|---|---|---|
| 10a | 100 | 10 |
| | | 100 |
| | 200 | 20 |
| | | 200 |
| 10b | 100 | 10 |
| | 300 | 20 |
| | | 200 |
| 10c | 200 | 100 |
| 10d | - | 200 |

FIG. 5

VIRTUAL NETWORK CONFIGURATION TABLE

| VIRTUAL NETWORK IDENTIFIER | PACKET RELAY DEVICE IDENTIFIER | VIRTUAL PACKET RELAY DEVICE IDENTIFIER | VLAN ID |
|---|---|---|---|
| 50a | 10a | 100 | 10 |
| | | | 100 |
| | 10b | 100 | 10 |
| | 10c | 200 | 100 |
| 50b | 10a | 200 | 20 |
| | | | 200 |
| | 10b | 300 | 20 |
| | | | 200 |
| | 10d | — | 200 |
| ... | ... | ... | ... |

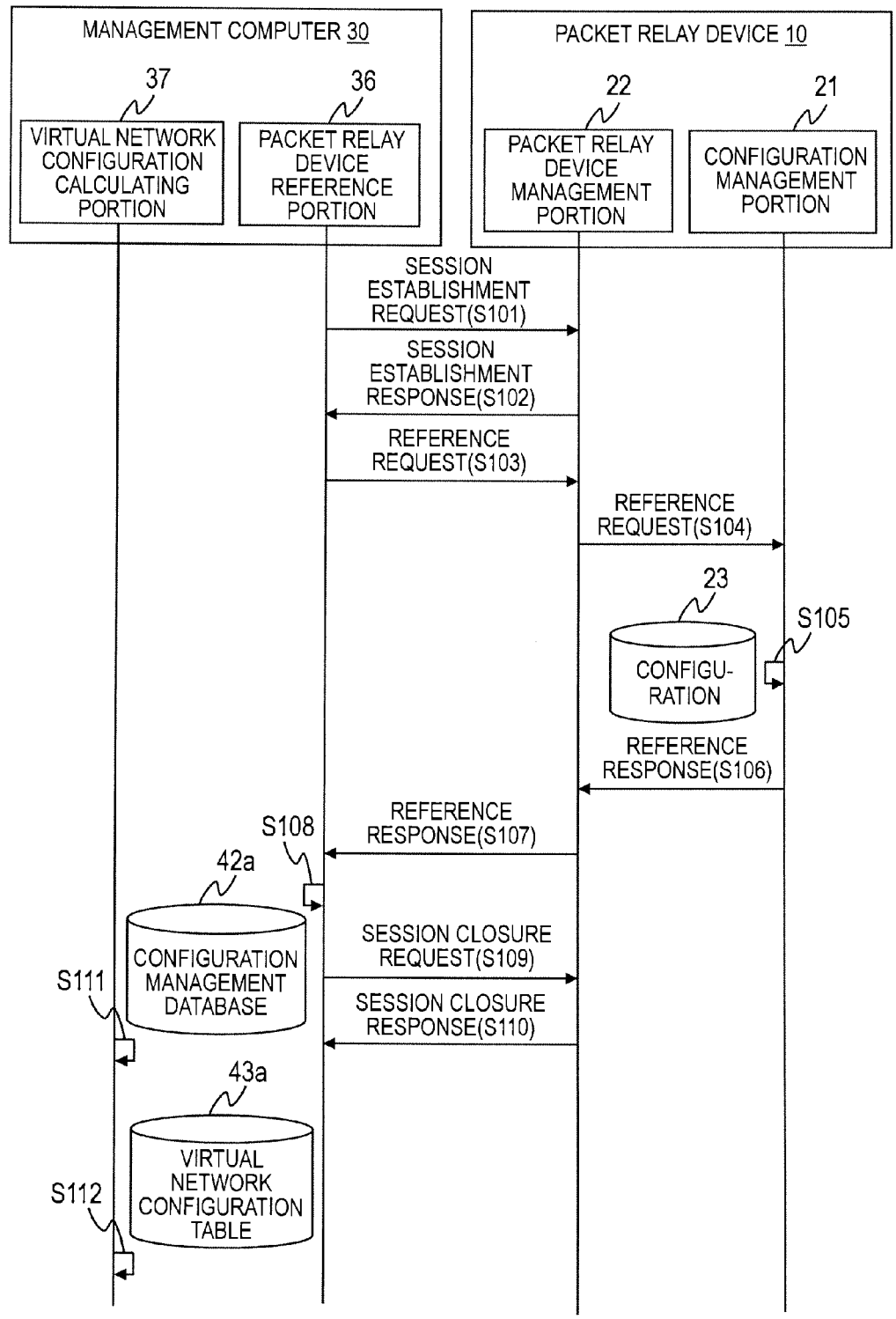

FIG. 15

CONFIGURATION MANAGEMENT DATABASE

| PACKET RELAY DEVICE IDENTIFIER | VIRTUAL PACKET RELAY DEVICE IDENTIFIER | PACKET TRANSMISSION/RECEPTION PORT |
|---|---|---|
| 10e | 100 | 10 |
| | | 11 |
| | 200 | 20 |
| | | 21 |
| 10f | 100 | 10 |
| | 300 | 20 |
| | | 21 |
| 10g | 200 | 10 |
| 10h | - | 20 |

FIG. 16

ADJACENT DEVICE INFORMATION DATABASE

| PACKET RELAY DEVICE | PACKET TRANSMISSION/ RECEPTION PORT | ADJACENT PACKET RELAY DEVICE | PACKET TRANSMISSION/ RECEPTION PORT |
|---|---|---|---|
| 10e | 10 | 10f | 10 |
| | 11 | 10g | 10 |
| | 20 | 10f | 20 |
| | 21 | ... | ... |
| 10f | 10 | 10e | 10 |
| | 20 | 10e | 20 |
| | 21 | 10h | 20 |
| 10g | 10 | 10e | 11 |
| 10h | 20 | 10f | 21 |

FIG. 17

VIRTUAL NETWORK CONFIGURATION TABLE

| VIRTUAL NETWORK IDENTIFIER | PACKET RELAY DEVICE IDENTIFIER | VIRTUAL PACKET RELAY DEVICE IDENTIFIER | PACKET TRANSMISSION/ RECEPTION PORT |
|---|---|---|---|
| 50c | 10e | 100 | 10 |
| | | | 11 |
| | 10f | 100 | 10 |
| | 10g | 200 | 10 |
| 50d | 10e | 200 | 20 |
| | | | 21 |
| | 10f | 300 | 20 |
| | | | 21 |
| | 10h | — | 20 |
| ... | ... | ... | ... |

431, 432, 433, 435, 43b 1001, 1002, 1003, 1005, 1006, 1009

NETWORK MANAGEMENT SYSTEM AND MANAGEMENT COMPUTER

CLAIM OF PRIORITY

The present application claims priority from Japanese patent application JP 2011-148173 filed on Jul. 4, 2011, the content of which is hereby incorporated by reference into this application.

BACKGROUND OF THE INVENTION

This invention relates to a network management system for managing a plurality of packet relay devices and managing virtual networks provided by virtual packet relay devices that are generated by packet relay devices.

Conventionally, a single packet relay device is operated as a single physical packet relay device in most cases. Virtual Router (VR) and Virtual Routing and Forwarding (VRF) are technologies related to the virtualization of a packet relay device that are used frequently in recent years. VR is a technology for virtually dividing a single packet relay device into a plurality of segments. VRF is a technology for virtually running a plurality of routing tables within a single packet relay device and thereby operating the single packet relay device virtually as a plurality of devices. A network administrator sets an arbitrary identifier to each of the virtual segments, or each of the virtually run routing tables, and manages a network based on the identifier.

The purpose of operating a single packet relay device virtually as a plurality of devices (virtual packet relay devices) is to operate a single physical network as a plurality of virtual networks by linking these virtual packet relay devices. There are the following two operation management styles which are distinguished from each other by how identifiers are assigned.

The first style involves assigning the same identifier to virtual packet relay devices that are linked, and exchanging identifiers between linked virtual packet relay devices so that the devices can each determine whether or not the other device is a member belonging to the same virtual network. Typical examples of this style include VLANs, VPNs constituted of MPLS+BGP, and VPNs constituted of VRF+BGP.

The second style does not involve exchanging identifiers between linked virtual packet relay devices but involves assigning arbitrary identifiers to virtual packet relay devices that are linked. Typical examples of this style include VR and VRF that do not use BGP. In this style, where BGP is unnecessary and arbitrary identifiers are set, virtual networks can easily be constructed at low cost but varied identifiers may be assigned to virtual packet relay devices that belong to the same virtual network while the same identifier is assigned to virtual packet relay devices that belong to different virtual networks.

SUMMARY OF THE INVENTION

In the second style, a network administrator cannot identify the actual configuration of a virtual network by simply referring to identifiers that are assigned to the respective virtual packet relay devices. In addition, the network administrator needs to be aware of other types of information than identifiers assigned to the respective virtual packet relay devices (VLAN IDs or packet transmission/reception port identifiers) when linking virtual packet relay devices to construct a virtual network, so as not to accidentally link virtual packet relay devices that belong to different virtual networks.

The network administrator is accordingly required to manage, for each virtual network, identifiers assigned to the respective virtual packet relay devices that constitute the virtual network and coupling relations of the virtual packet relay devices (VLAN IDs or packet transmission/reception port identifiers). The management of these is a laborious work for the network administrator to do manually.

This invention has been made in view of the above, and it is an object of this invention to provide a network management system that enables a network administrator to manage virtual networks without needing to be aware of the identifiers of virtual packet relay devices.

According to an aspect of the present invention, there is provided a network management system for managing a plurality of packet relay devices, the network management system comprising: the plurality of packet relay devices constituting networks; and a display device for displaying configurations of the networks, wherein each of the plurality of packet relay devices can generate at least one virtual packet relay device, wherein the virtual packet relay devices generated in the plurality of packet relay devices constitute a plurality of virtual first networks, wherein each of the virtual packet relay devices is assigned a virtual packet relay device identifier unique throughout the packet relay device in which the each of the virtual packet relay devices is generated, wherein each of the plurality of virtual first networks can be divided into at least one virtual second network, wherein the each of the plurality of packet relay devices manages, as configuration information, the virtual packet relay device identifier assigned to the each of the plurality of packet relay devices and a second-network identifier which is an identifier of the at least one virtual second network, wherein the network management system further comprises: a configuration information obtaining module which obtains the configuration information from the each of the plurality of packet relay devices and stores the obtained configuration information in a configuration information management table; a first-network identifying module which, in a case where the configuration information obtaining module obtains the configuration information from the each of the plurality of packet relay devices, identifies the virtual first network to which the virtual packet relay device identifier included in the obtained configuration information belongs, and registers the obtained configuration information in a first-network configuration table in association with a first network identifier that is an identifier of the identified virtual first network; and a network configuration display module which, in a case where a display request to display a configuration of given one of the plurality of virtual first networks is received, refers to the first-network configuration table and displays the configuration of the given one of the plurality of virtual first networks on the display device, wherein the first-network identifying module is configured to: in a case where the configuration information obtaining module obtains the configuration information from the each of the plurality of packet relay devices, extract the virtual packet relay device identifier and the second-network identifier from the obtained configuration information; determine whether or not the virtual packet relay device identifier of the virtual packet relay device that is assigned the second-network identifier associated with the extracted second-network identifier is registered in the first-network configuration table; in a case where it is determined that the virtual packet relay device identifier of the virtual packet relay device that is assigned the second-network identifier associated with the extracted second-network identifier is not registered in the first-network configuration table, generate a new first-network identifier and register the generated new first-network identifier in the first-network configuration table in association with the obtained configuration information; and in a case where it is determined that the virtual packet relay device identifier of the virtual packet relay device that is assigned the second-network identifier associated with the extracted second-network identifier is registered in the first-network configuration table, associate the first-network identifier that is associated with the virtual packet relay device identifier with the obtained configuration information, and register the association between the first-network identifier and the obtained configuration information in the first-network configuration table, and wherein, in a case of receiving the display request, the network configuration display module refers to the first-network configuration table and identifies the virtual packet relay device identifier that is associated with the first-network identifier of the given one of the plurality of virtual first networks, to thereby identify the configuration of the given one of the plurality of virtual first networks and display the identified configuration of the given one of the plurality of virtual first networks on the display device.

According to this invention, a network management system that enables a network administrator to manage virtual networks without needing to be aware of the identifiers of virtual packet relay devices is provided.

BRIEF DESCRIPTION OF THE DRAWINGS

The present invention can be appreciated by the description which follows in conjunction with the following figures, wherein:

FIG. 4 is an explanatory diagram of a configuration management database according to the first embodiment of this invention;

FIG. 5 is an explanatory diagram of a virtual network configuration table according to the first embodiment of this invention;

FIG. 7 is a sequence diagram of a configuration information obtaining processing in which the management computer obtains configuration information stored in a configuration from the packet relay devices, according to the first embodiment of this invention;

FIG. 15 is an explanatory diagram of the configuration management database according to the second embodiment of this invention;

FIG. 16 is an explanatory diagram of adjacent device information database according to the second embodiment of this invention;

FIG. 17 is an explanatory diagram of the virtual network configuration table according to the second embodiment of this invention;

DETAILED DESCRIPTION OF THE PREFERRED EMBODIMENTS

First Embodiment

A first embodiment is described with reference to FIGS. 1 to 11.

Figure 1:
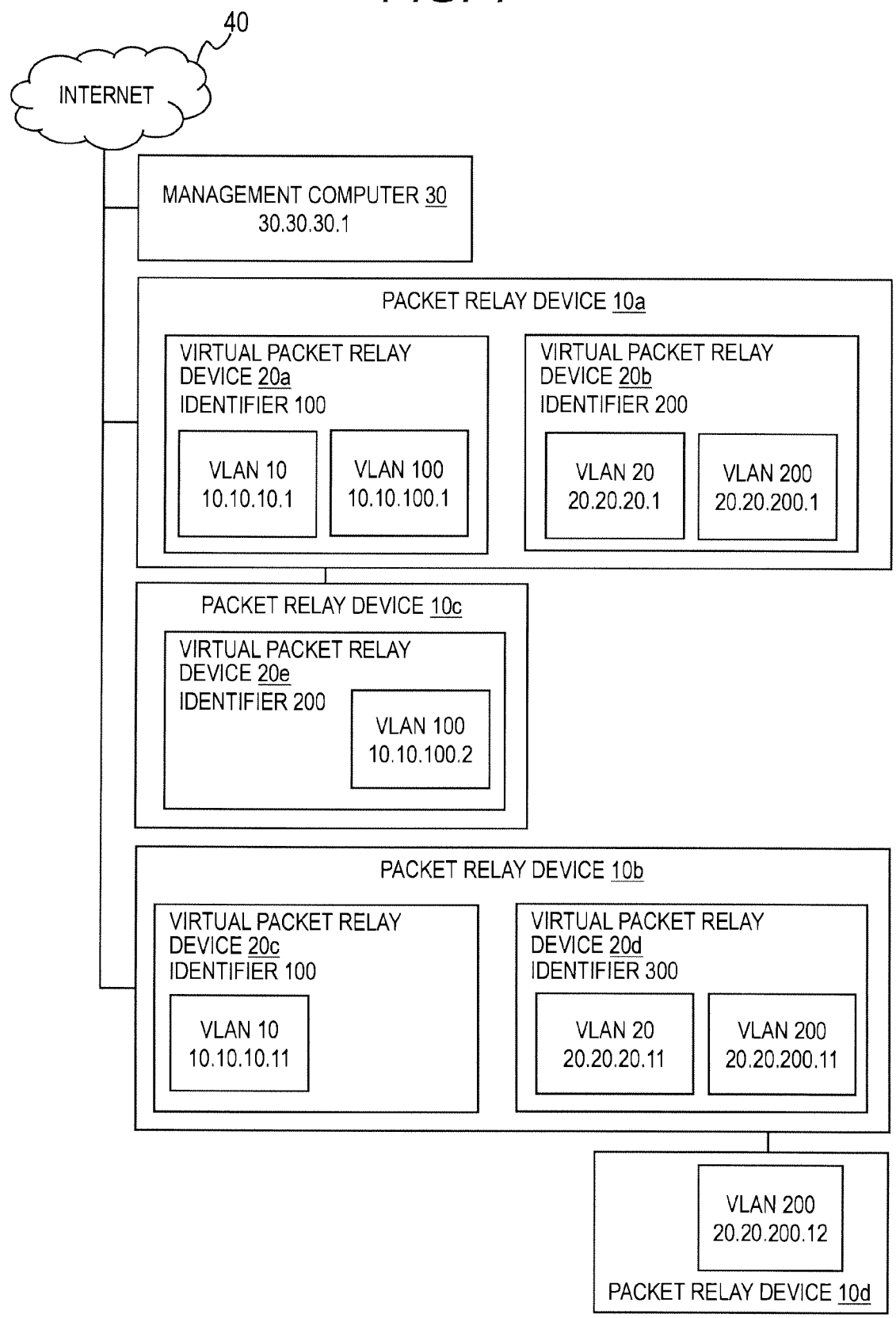
FIG. 1 is a network configuration diagram of a network management system according to a first embodiment of this invention.

FIG. 1 is a network configuration diagram of a network management system according to the first embodiment of this invention.

The network management system includes a plurality of packet relay devices 10a to 10d (hereinafter, collectively referred to as packet relay devices 10) and a management computer 30. The plurality of packet relay devices 10 and the management computer 30 are connected to the Internet which is denoted by 40.

The plurality of packet relay devices 10 and the management computer 30 are connected by Ethernet (trademark) cables. IP addresses are allocated to the plurality of packet relay devices 10 and the management computer 30, and are used to identify the locations of the respective devices.

In FIG. 1, the packet relay device 10a and the packet relay device 10b are coupled to each other, the packet relay device 10c is coupled to the packet relay device 10a, and the packet relay device 10d is coupled to the packet relay device 10b.

The packet relay devices 10 generate virtual packet relay devices 20a to 20d (hereinafter, collectively referred to as virtual packet relay devices 20) in themselves. The virtual packet relay devices 20 may be implemented by virtually dividing the packet relay devices 10 into a plurality of devices or by keeping a plurality of virtual routing tables in the packet relay devices 10.

In FIG. 1, the virtual packet relay devices 20a and 20b operate on the packet relay device 10a, the virtual packet relay devices 20c and 20d operate on the packet relay device 10b, and the virtual packet relay device 20e operates on the virtual packet relay device 10c.

By coupling the virtual packet relay devices 20 to one another, a plurality of virtual networks (first networks) is constructed in a single physical network.

The virtual packet relay devices 20a, 20c, and 20e are coupled in FIG. 1 to constitute one virtual network (hereinafter, referred to as virtual network A). Specifically, the virtual packet relay devices 20a and 20c are coupled to each other and the virtual packet relay device 20e is coupled to the virtual packet relay device 20a.

Further, the virtual packet relay devices 20b and 20d, and the packet relay device 10d are coupled in FIG. 1 to constitute one virtual network (hereinafter, referred to as virtual network B). Specifically, the virtual packet relay devices 20b and 20d are coupled to each other and the packet relay device 10d is coupled to the virtual packet relay device 20d.

Two virtual networks are thus constructed in a single physical network in FIG. 1.

A network administrator operates one virtual network as one physical network. At least one virtual network (second network) can be set to one virtual network. The second network may be, for example, a virtual local area network (VLAN) constructed from VLAN identifiers (VLAN IDs) that are set to virtual packet relay devices, or a virtual network constructed by associating the virtual packet relay devices 20 with packet transmission/reception ports 14 (illustrated in FIG. 2).

A case where the second network is a VLAN is described in this embodiment, and a case where the second network is constructed by associating the virtual packet relay devices 20 with the packet transmission/reception ports 14 is described in a second embodiment.

In FIG. 1, two VLANs identified by VLAN IDs 10 and 100 are set in the virtual network A. The VLAN IDs 10 and 100 are set to the virtual packet relay device 20a, the VLAN ID 10 is set to the virtual packet relay device 20c, and the VLAN ID 100 is set to the virtual packet relay device 20e.

Further, two VLANs identified by VLAN IDs 20 and 200 are set in the virtual network B. The VLAN IDs 20 and 200 are set to the virtual packet relay device 20b, the VLAN IDs 20 and 200 are set to the virtual packet relay device 20d, and the VLAN ID 200 is set to the packet relay device 10d.

Each virtual packet relay device 20 or packet relay device 10 to which a VLAN ID is set receives only packets that contain the VLAN ID set to itself, and transmits a packet that contains the VLAN ID set to itself. A single virtual network is thus divided by VLAN IDs into one or more VLANs.

The management computer 30 accesses the packet relay devices 10 via the Internet 40 to obtain configuration information (a configuration 23 illustrated in FIG. 2) set in the packet relay devices 10, or to set configuration information of the packet relay devices 10. The configuration information of one packet relay device 10 includes, for example, virtual packet relay device identifiers assigned to the virtual packet relay devices 20 that are generated in the packet relay device 10, and VLAN IDs set to the virtual packet relay devices 20.

A virtual packet relay device identifier is assigned when a virtual packet relay device is generated. To set configuration information about a virtual packet relay device (a VLAN ID), the management computer 30 identifies a particular virtual packet relay device by specifying the virtual packet relay device identifier of this virtual packet relay device.

The virtual packet relay device 20a which is one of the constituents of the virtual network A is assigned a virtual packet relay device identifier 100, the virtual packet relay device 20c which is one of the constituents of the virtual network A is assigned the virtual packet relay device identifier 100, and the virtual packet relay device 20e which is one of the constituents of the virtual network A is assigned a virtual packet relay device identifier 200.

On the other hand, the virtual packet relay device 20b which is one of the constituents of the virtual network B is assigned a virtual packet relay device identifier 200 and the virtual packet relay device 20d which is one of the constituents of the virtual network B is assigned the virtual packet relay device identifier 300.

Virtual packet relay device identifiers must be unique throughout the same packet relay device 10, and must be available packet relay device identifiers set to the packet relay device 10 in advance.

Assigning the same virtual packet relay device identifier to virtual packet relay devices that constitute the same virtual network is most efficient because then virtual packet relay device identifiers can be used to identify virtual networks. However, assigning the same virtual packet relay device identifier to virtual packet relay devices that constitute the same virtual network is not always possible due to the above and other circumstances.

For example, in FIG. 1, the virtual packet relay devices 20a and 20e which are constituents of the virtual network A have different virtual packet relay device identifiers, "100" and "200", and the virtual packet relay devices 20b and 20d which are constituents of the virtual network B have different virtual packet relay device identifiers, "200" and "300".

Virtual packet relay device identifiers cannot be used as virtual network identifiers in this case, which means that the network administrator cannot use information for identifying virtual networks and is required to understand the virtual network configurations by checking VLAN IDs.

This embodiment describes in detail a network management system that enables a network administrator to readily understand the relation between a virtual packet relay device and a virtual network whose constituents include the virtual packet relay device even when virtual packet relay devices that constitute the virtual network have different virtual packet relay device identifiers.

This embodiment also describes a network management system in which a new packet relay device 10 is added to one virtual network and identifiers are automatically set to the virtual packet relay devices 20 that are generated in the added packet relay device 10.

This embodiment further describes a network management system capable of detecting the fact that a VLAN ID that is about to be set to one virtual network is already set to another virtual network and stopping the setting of the VLAN ID.

The network configuration, the number of virtual networks constructed in a physical network, the number of VLANs generated in virtual networks, and the number of virtual packet relay devices 20 generated in the packet relay devices 10 are not limited to those in the example of FIG. 1.

The management computer 30 may be implemented by a single computer or by a plurality of computers. The management computer 30 may also be implemented by one or more packet relay devices 10.

Figure 2:
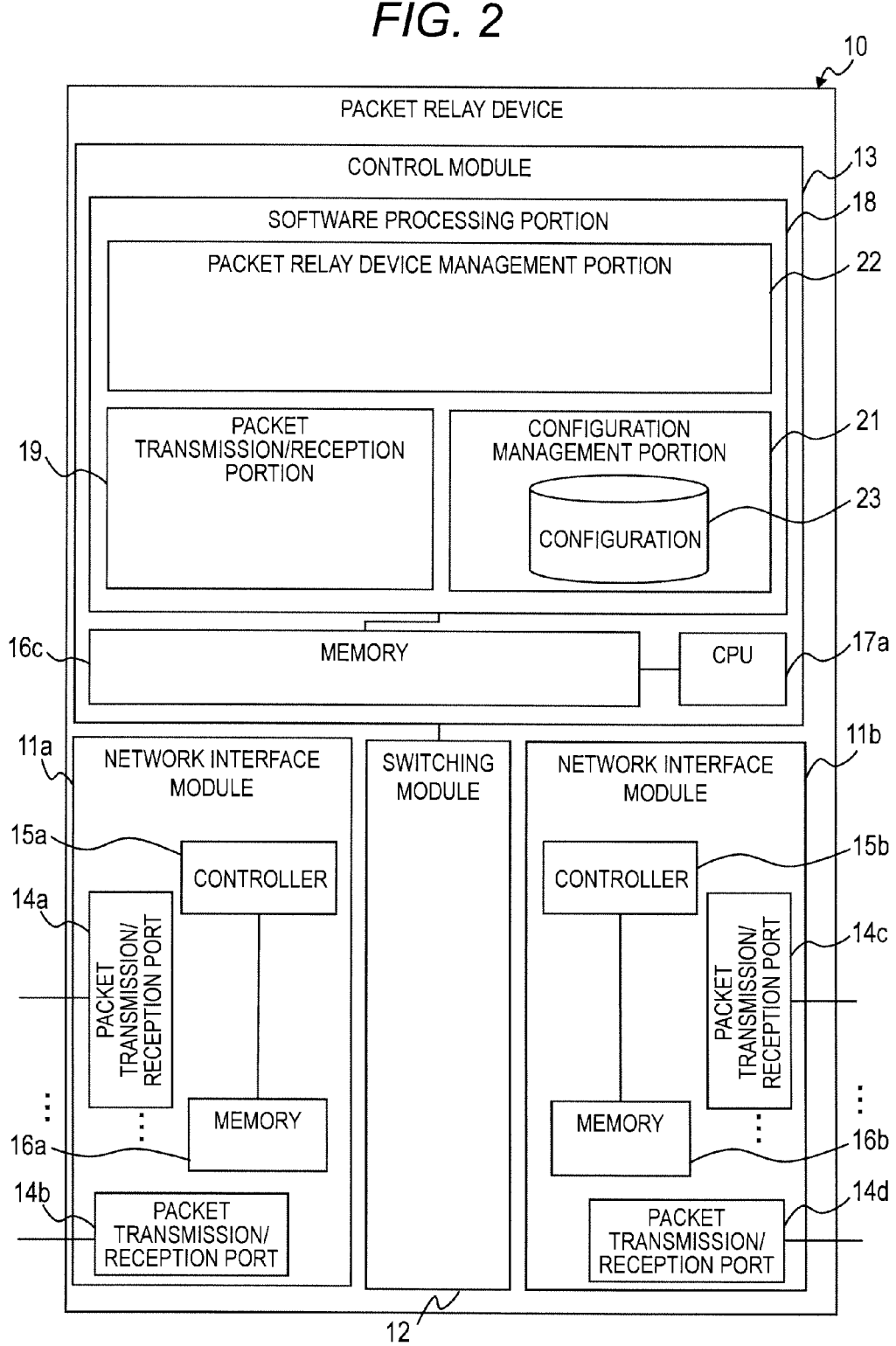
FIG. 2 is a block diagram illustrating a configuration of packet relay devices according to the first embodiment of this invention.

FIG. 2 is a block diagram illustrating the configuration of the packet relay devices 10 according to the first embodiment of this invention.

Each packet relay device 10 includes network interface modules 11a and 11b (hereinafter, collectively referred to as network interface modules 11), a switching module 12, and a control module 13.

The network interface modules 11 are described by taking the network interface module 11a as an example.

The network interface module 11a includes packet transmission/reception ports 14a and 14b (hereinafter, collectively referred to as packet transmission/reception ports 14), a controller 15a, and a memory 16a. Ethernet cables are physically connected to the packet transmission/reception ports 14. The controller 15a analyzes packets received via the packet transmission/reception ports 14 and identifies the addresses of the received packets. The memory 16a functions as a buffer that temporarily stores packets received via the packet transmission/reception ports 14.

The network interface module 11b has the same configuration as that of the network interface module 11a, and includes packet transmission/reception ports 14c and 14d, a controller 15b, and a memory 16b. The packet transmission/reception ports 14c and 14d correspond to the packet transmission/reception ports 14a and 14b, respectively, the controller 15b corresponds to the controller 15a, and the memory 16b corresponds to the memory 16a. The controllers 15a and 15b are collectively referred to as controllers 15.

Each controller 15 determines whether or not a packet received by its associated network interface module 11 is addressed to devices other than its own packet relay device.

When determining that the received packet is addressed to another device, the controller 15 refers to an address table in which the destination device is associated with the network interface module 11 and the packet transmission/reception port 14 from which a packet addressed to the destination device is output, and identifies the network interface module 11 and the packet transmission/reception port 14 that are to output the received packet.

The controller 15 then transfers the received packet from the identified network interface module 11 and packet transmission/reception port 14.

When determining that the received packet is not addressed to another device, i.e., that the received packet is addressed to its own packet relay device, the controller 15 hands over the received packet to the control module 13 that is included in its own packet relay device.

The switching module 12 switches communication paths between the network interface modules 11 and communication paths between the network interface modules 11 and the control module 13, based on instructions from the network interface modules 11 and the control module 13.

The control module 13 includes a memory 16c and a CPU 17a. The memory 16c stores a program for implementing a software processing portion 18, and the CPU 17a functions as the software processing portion 18 by executing the program stored in the memory 16c.

The software processing portion 18 includes a packet transmission/reception portion 19, a configuration management portion 21, and a packet relay device management portion 22.

The packet transmission/reception portion 19 exerts control over the reception of packets addressed to its own packet relay device and the transmission of packets addressed to other devices. For example, in the case where the packet transmission/reception portion 19 receives a packet handed over from another component as a packet that is addressed to its own packet relay device and the packet is a configuration information reference request (illustrated in FIG. 7) or configuration information setting request (illustrated in FIG. 9) transmitted from the management computer 30, the packet transmission/reception portion 19 forwards the received packet to the packet relay device management portion 22.

When receiving a packet that is handed over from the packet relay device management portion 22, on the other hand, the packet transmission/reception portion 19 transfers the packet to a desired computer/packet relay device functioning as the management computer 30. A packet handed over from the packet relay device management portion 22 is a configuration information reference response to a configuration information reference request, or a configuration information setting response to a configuration information setting request.

When a configuration information setting request transmitted from the management computer 30 is received via the packet transmission/reception portion 19, the packet relay device management portion 22 analyzes the configuration information setting request and instructs the configuration management portion 21 to set configuration information. A configuration information setting request is a request to set various items concerning the operation of the packet relay device 10, and can be, for example, a request to generate a new virtual packet relay device 20, a request to remove one of the virtual packet relay devices 20, a request to newly set a VLAN, a request to remove a VLAN, or the like.

The configuration management portion 21 holds the configuration (configuration information) 23, sets the packet relay device 10 based on a configuration information setting request handed over to the packet relay device management portion 22, and then records the set settings in the configuration 23.

The configuration 23 records overall settings information of the packet relay device 10 and overall state information (configuration information) of the packet relay device 10. For example, information of virtual packet relay devices and VLANs that are run on the packet relay device 10 are recorded in the configuration 23.

Figure 3:
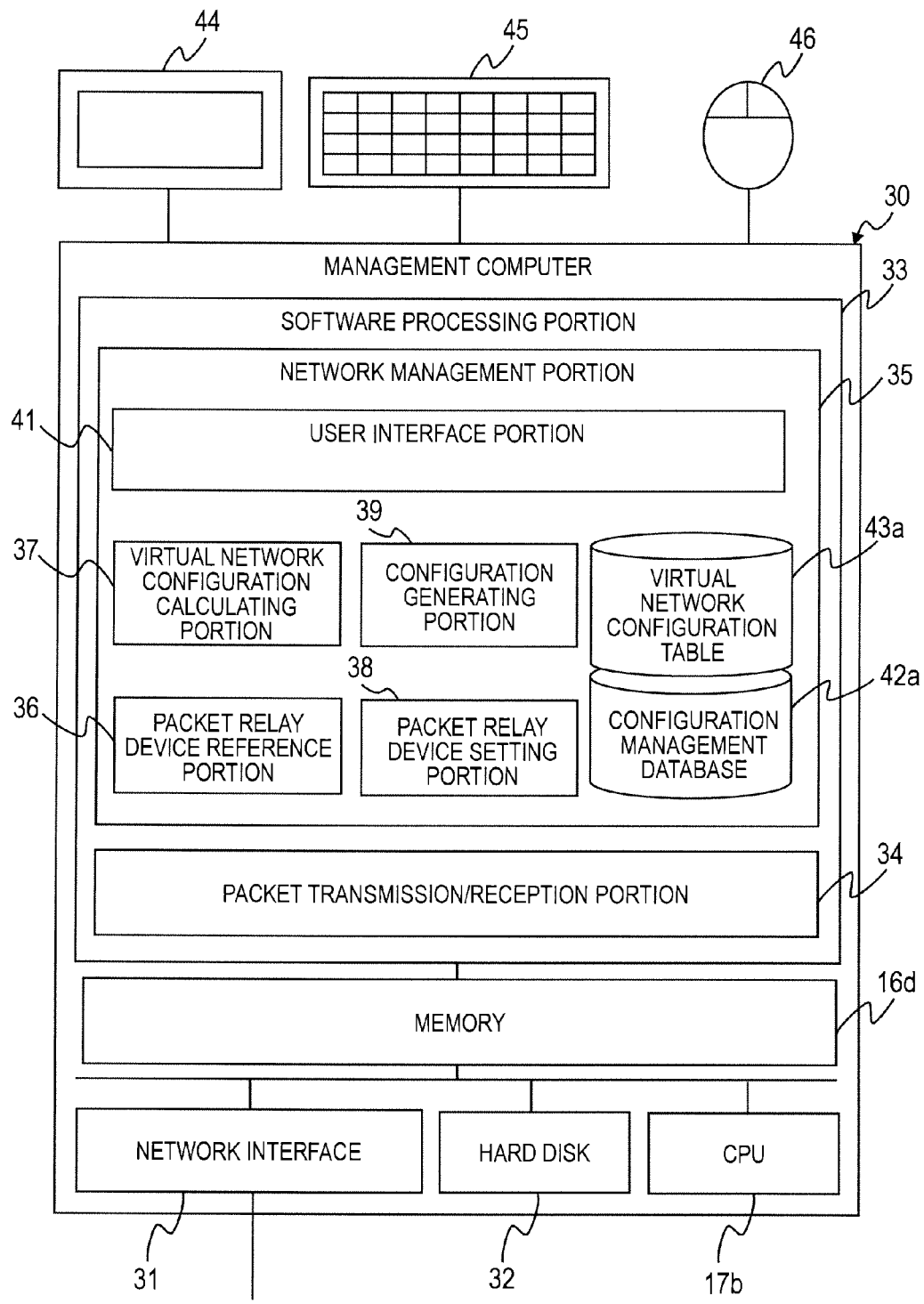
FIG. 3 is a block diagram illustrating a configuration of a management computer according to the first embodiment of this invention.

FIG. 3 is a block diagram illustrating the configuration of the management computer 30 according to the first embodiment of this invention.

The management computer 30 is constituted of, for example, a general-purpose computer, and includes a network interface 31, a hard disk 32, a memory 16d, and a CPU 17b.

The network interface 31 is a physical interface for transmitting and receiving packets. The hard disk 32 stores programs and various other types of information.

The memory 16d stores a program for implementing a software processing portion 33, and the CPU 17b functions as the software processing portion 33 by executing the program stored in the memory 16d.

A packet transmission/reception portion 34 handles the transmission and reception of packets via the network interface 31.

A network management portion 35 is an application running as a front end which is used by the network administrator to manage the packet relay devices 10. The network management portion 35 includes a packet relay device reference portion 36, a virtual network configuration calculating portion 37, a packet relay device setting portion 38, a configuration generating portion 39, a user interface portion 41, a configuration management database 42a, and a virtual network configuration table 43a.

The user interface portion 41 is a network configuration display portion which generates graphical user interface (GUI) display data to be displayed on a display device 44 in order to enable the network administrator to manage the configurations of virtual networks. The user interface portion 41 also receives an instruction from the network administrator via a keyboard 45 and a mouse 46. Examples of instructions from the network administrator include a network configuration reference instruction and a setting instruction for setting configuration information of the packet relay devices 10.

The packet relay device reference portion 36 transmits to the packet relay devices 10 a reference request, which is a request to obtain configuration information stored in the configurations 23 of the packet relay devices 10. The reference request may be transmitted at the time the management computer 30 detects the addition of a new packet relay device 10 to the network, may be transmitted periodically, or may be transmitted at the time the management computer 30 receives a network configuration reference instruction from the network administrator, for example. Details of the processing in which the management computer 30 obtains configuration information of the packet relay devices 10 are described later with reference to FIG. 7.

Obtaining configuration information that has been stored in the configuration 23 from the packet relay devices 10, the packet relay device reference portion 36 updates the configuration management database 42a (a configuration information management table) based on the obtained configuration information.

The packet relay device reference portion 36 thus functions as a configuration information obtaining portion for obtaining configuration information from the packet relay devices 10 and registering the obtained configuration information in the configuration management database 42a.

The virtual network configuration calculating portion 37 refers to the configuration management database 42a and the virtual network configuration table 43a to identify, for each virtual network, virtual packet relay devices that constitute the virtual network and coupling relations of the virtual packet relay devices. Details of the processing of identifying these are described later with reference to FIGS. 8A and 8B.

The virtual network configuration calculating portion 37 assigns the same virtual network identifier to the virtual packet relay devices 20 that constitute the same virtual network, and registers this virtual network identifier in the virtual network configuration table 43a in association with configuration information of the virtual packet relay devices 20 that are assigned this virtual network identifier.

The virtual network configuration calculating portion 37 refers to the virtual network configuration table 43a to identify the configurations of respective virtual networks, and the user interface portion 41 draws on the display device 44 the virtual network configurations identified by the virtual network configuration calculating portion 37. In this manner, the network administrator can grasp the configurations of the respective virtual networks without needing to be aware of virtual network identifiers.

The virtual network configuration calculating portion 37 functions as a first network identifying portion. The first network identifying portion identifies a first network to which virtual packet relay device identifiers that are included in configuration information obtained from the packet relay devices 10 belong, and registers the obtained configuration information in a first network configuration table (the virtual network configuration table 43a) in association with a first network identifier, which is the identifier of the identified first network.

When the user interface portion 41 receives an instruction to set one of the packet relay devices 10 from the network administrator, the packet relay device setting portion 38 transmits a setting request that corresponds to the received setting instruction to the packet relay device 10.

A setting request is a request to set configuration information of one of the packet relay devices 10, and can be, for example, a request to generate a new virtual packet relay device 20, a request to remove one of the virtual packet relay devices 20, a request to set a VLAN, a request to remove a VLAN, or the like. Details of the processing of setting configuration information of the packet relay devices 10 are described later with reference to FIGS. 8A and 8B to FIG. 10.

The packet relay device setting portion 38 also receives a response from the packet relay device 10 for which configuration information has been set based on the setting request, and updates the configuration management database 42a based on the received response.

When the user interface portion 41 receives from the network administrator an instruction to add one packet relay device 10, namely, an instruction to add a new packet relay device 10 to existing packet relay devices 10, the configuration generating portion 39 determines a virtual network identifier and a VLAN ID that are to be assigned to the new packet relay device 10 to be added. In this manner, the network administrator can add a new packet relay device 10 to a virtual network without needing to be aware of virtual network identifiers and VLAN IDs that are to be assigned to virtual packet relay devices.

In order to set the virtual network identifier and VLAN ID determined by the configuration generating portion 39 in the new packet relay device 10 to be added, the packet relay device setting portion 38 transmits a configuration information setting request to the new packet relay device 10.

The configuration generating portion 39 receives a response to the configuration information setting request transmitted by the packet relay device setting portion 38, and updates the configuration management database 42a and the virtual network configuration table 43a accordingly.

FIG. 4 is an explanatory diagram of the configuration management database 42a according to the first embodiment of this invention.

The configuration management database 42a is a database used to manage configuration information obtained from the packet relay devices 10, and includes a packet relay device identifier 421, a virtual packet relay device identifier 422, and a VLAN ID 423.

Registered as the packet relay device identifier 421 is a packet relay device identifier that is the identifier of the packet relay device 10 whose configuration information has been obtained. Registered as the virtual packet relay device identifier 422 is a virtual packet relay device identifier that is the identifier of the virtual packet relay device 20 generated in the packet relay device 10 whose configuration information has been obtained. Registered as the VLAN ID 423 is a VLAN ID that is the identifier of a VLAN set to the virtual packet relay device 20 in question.

FIG. 5 is an explanatory diagram of the virtual network configuration table 43a according to the first embodiment of this invention.

The virtual network configuration table 43a is a table used to manage a virtual network identifier in association with the virtual packet relay device identifiers of virtual packet relay devices that constitute a virtual network identified by this virtual network identifier. The virtual network configuration table 43a includes a virtual network identifier 431, a packet relay device identifier 432, a virtual packet relay device identifier 433, and a VLAN ID 434.

Registered as the virtual network identifier 431 is a virtual network identifier which is the identifier of a virtual network.

Registered as the packet relay device identifier 432 is the packet relay device identifier of a packet relay device that generates virtual packet relay devices having virtual packet relay device identifiers that are associated with the virtual network identifier of the entry in question.

Registered as the virtual packet relay device identifier 433 is the virtual packet relay device identifier that is associated with the virtual network identifier of the entry in question.

Registered as the VLAN ID 434 is a VLAN ID that is the identifier of a VLAN set to one of the virtual packet relay devices having virtual packet relay device identifiers that are associated with the virtual network identifier of the entry in question.

Figure 6:
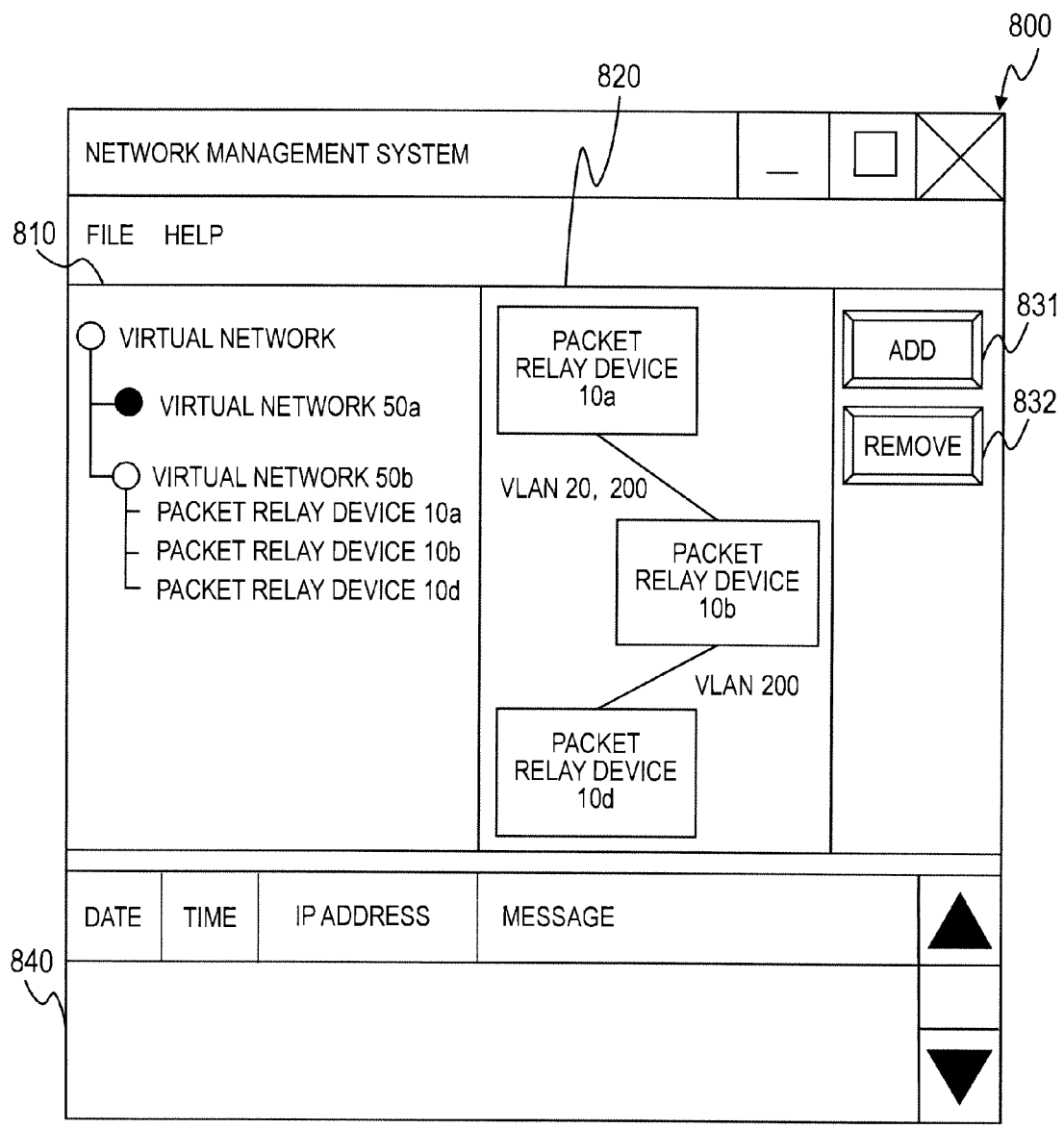
FIG. 6 is an explanatory diagram of a network configuration display screen that is displayed on a display device of the management computer according to the first embodiment of this invention.

FIG. 6 is an explanatory diagram of a network configuration display screen 800 that is displayed on the display device 44 of the management computer 30 according to the first embodiment of this invention.

The network configuration display screen 800 displays the configurations of virtual networks constructed in the network of FIG. 1. The network configuration display screen 800 specifically displays the network topology of a virtual network with the use of icons that represent the packet relay devices 10 and icons that represent Ethernet cables.

The network configuration display screen 800 includes a virtual network list display area 810, a network topology display area 820, an "add" button 831, a "remove" button 832, and a log display area 880.

The virtual network list display area 810 is displayed on the left side of the network configuration display screen 800, and displays a list of all virtual networks constructed in the network of FIG. 1. A virtual network on the list displayed in the virtual network list display area 810 can be selected by the network administrator, and the virtual network list display area 810 displays the packet relay devices 10 that generate the virtual packet relay devices 20 constituting the selected virtual network. The description given below is simplified by referring to the packet relay devices 10 that generate the virtual packet relay devices 20 constituting a virtual network simply as the packet relay devices 10 that belong to the virtual network.

In FIG. 6, a virtual network 50b is selected and the packet relay devices 10a, 10b, and 10d which belong to the virtual network 50b are displayed.

The network topology display area 820 is displayed at the center of the network configuration display screen 800, and displays the network topology of a virtual network selected in the virtual network list display area 810.

In FIG. 6, where the virtual network 50b is selected in the virtual network list display area 810, the network configuration display screen 800 displays the packet relay devices 10a, 10b, and 10d belonging to the virtual network 50b, and displays that the packet relay devices 10a and 10b are coupled to each other by VLANs identified by VLAN IDs 20 and 200, and that the packet relay devices 10b and 10d are coupled to each other by the VLAN identified by the VLAN ID 200.

A description is given on processing of identifying the packet relay devices 10 that belong to a virtual network selected by the network administrator and processing of identifying a coupling relation between the packet relay devices 10.

First, the virtual network configuration calculating portion 37 refers to the virtual network configuration table 43a of FIG. 5 to obtain an entry in which the identifier of the selected virtual network is registered as the virtual network identifier 431. The virtual network configuration calculating portion 37 then identifies, as the identifiers of the virtual packet relay devices 10 that belong to the selected virtual network, each packet relay device identifier registered as the packet relay device identifier 432 in the obtained entry.

The virtual network configuration calculating portion 37 further identifies that the packet relay devices 10 for which the same VLAN ID is registered as the VLAN ID 434 in the obtained entry are coupled to each other.

This way, virtual packet relay device identifiers are not displayed on the display device 44 even when the virtual packet relay devices 20 that constitute a virtual network are not assigned the same virtual packet relay device identifier, and the network administrator can thus check the configurations of the respective virtual networks without needing to be aware of virtual packet relay device identifiers.

The "add" button 831 and the "remove" button 832 are displayed on the left side of the network configuration display screen 800. When the "add" button 831 is operated and the packet relay device 10 to which a new packet relay device 10 is coupled is selected from among the packet relay devices 10 displayed in the network topology display area 820, the new packet relay device 10 is added to a virtual network selected in the virtual network list display area 810.

When the coupling destination packet relay device 10 is selected, the coupling destination packet transmission/reception port 14 to which the new packet relay device 10 is coupled is also selected from among the packet transmission/reception ports 14 that are included in the coupling destination packet relay device 10.

The network administrator arbitrarily selects one of the packet relay devices 10 displayed in the network topology display area 820 and operates the "remove" button 832, to thereby remove the selected packet relay device 10 from a virtual network selected in the virtual network list display area 810.

When the network administrator operates the "add" button 831 or the "remove" button 832 with the keyboard 45 and the mouse 46, or with other measures, configuration information (virtual packet relay device identifiers and VLAN IDs) is generated which needs to be set in the respective packet relay devices 10 in order to accommodate the addition or removal of one of the packet relay devices 10. Details of the processing of generating configuration information are described later with reference to FIGS. 9 and 10.

The network administrator can therefore change the configuration of a virtual network without manually setting configuration information that needs to be set in order to accommodate the configuration change.

The log display area 440 is displayed at the bottom of the network configuration display screen 800, and displays a log of operations such as the addition or removal of one of the packet relay devices 10.

The log includes a date at which an operation has been made, a time at which the operation has been made, the IP address of the packet relay device 10 for which the operation has been made, and a message indicating the specifics of the operation.

FIG. 7 is a sequence diagram of the configuration information obtaining processing in which the management computer 30 obtains configuration information stored in the configuration 23 from the packet relay devices 10, according to the first embodiment of this invention.

When a given condition is established, the packet relay device reference portion 36 of the management computer 30 transmits a session establishment request to the packet relay device management portion 22 of every packet relay device 10 (S101).

The given condition is established when the network administrator instructs via the keyboard 45 and the mouse 46 to issue a reference request and, in the case where the configuration information obtaining processing is executed periodically, is established when a scheduled time arrives.

Receiving the session establishment request, the packet relay device management portion 22 determines whether or not a session can be established. In the case where establishing a session is determined as possible, the packet relay device management portion 22 transmits a session establishment response which includes a session identifier to the packet relay device reference portion 36 of the management computer 30 (S102).

The session identifier is attached to packets that are communicated between the management computer 30 and the packet relay device 10 in question from then on. This enables the management computer 30 and the packet relay device 10 to process successive requests while maintaining consistency.

In the case where establishing a session is determined as impossible, a session is not established between the management computer 30 and the packet relay device 10 in question, and the configuration information obtaining processing is therefore ended.

The processing of determining whether or not a session can be established is executed by using as a reference whether or not an upper limit to the number of sessions that the packet relay device 10 can establish has been exceeded, and whether or not the sender of the session establishment request is a reliable source.

Receiving the session establishment response from the packet relay device 10, the packet relay device reference portion 36 of the management computer 30 transmits to this packet relay device 10 a configuration information reference request which is a request to obtain configuration information stored in the configuration 23 of the packet relay device 10 (S103).

Receiving the configuration information reference request from the management computer 30, the packet relay device management portion 22 of the packet relay device 10 hands over the received configuration information reference request to the configuration management portion 21 (S104).

Receiving the configuration information reference request from the packet relay device management portion 22, the configuration management portion 21 refers to the configuration 23 (S105), obtains configuration information stored in the configuration 23, and hands over a configuration information reference response which includes the obtained configuration information to the packet relay device management portion 22 (S106). The packet relay device management portion 22 transmits the handed over configuration information reference response to the packet relay device reference portion 36 (S107).

Receiving the configuration information reference response from the packet relay device 10, the packet relay device reference portion 36 registers in the configuration management database 42a the configuration information included in the received configuration information reference response (S108). The packet relay device reference portion 36 then transmits a session closure request which is a request to close a session to the packet relay device management portion 22 of the packet relay device 10 that has sent the configuration information reference response (S109).

Receiving the session closure request from the management computer 30, the packet relay device management portion 22 closes the session and transmits a session closure response to the packet relay device reference portion 36 of the management computer 30 (S110). This concludes the description of a procedure that the management computer 30 follows to obtain configuration information of each packet relay device 10.

Thereafter, the virtual network configuration calculating portion 37 refers to the configuration management database 42a (S111) to identify virtual networks constituted of the virtual packet devices 20 that are generated in the packet relay device 10 whose configuration information has been obtained, and registers virtual packet relay device identifiers of these virtual packet relay devices 20 in the virtual network configuration table 43a in association with virtual network identifiers of the identified virtual networks (S112).

The processing of S111 and S112 is referred to as virtual network identifying processing, and details thereof are described with reference to FIGS. 8A and 8B.

Figure 8A:
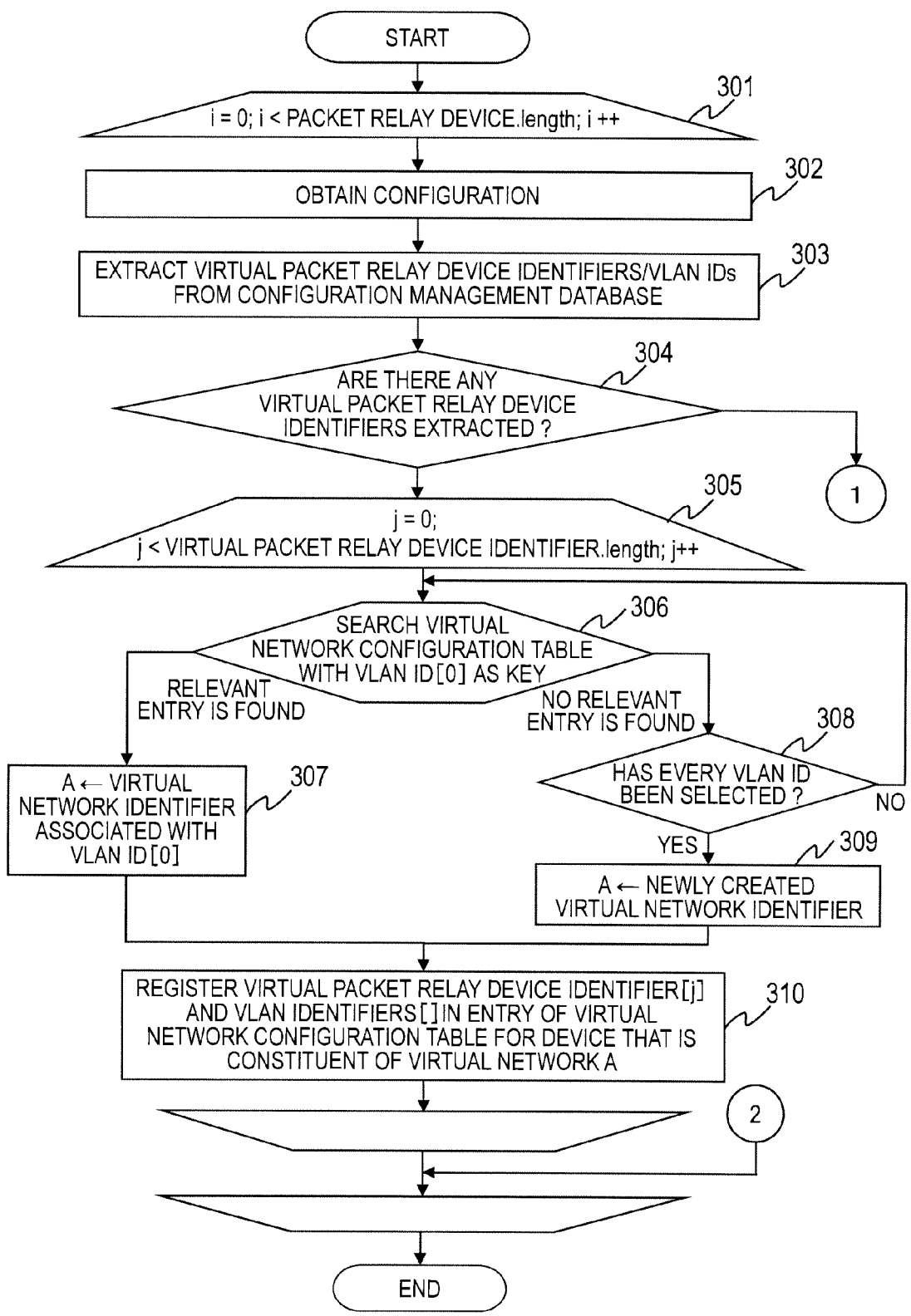
FIG. 8A is a flow chart of virtual network identifying processing that is executed by a virtual network configuration calculating portion according to the first embodiment of this invention.

FIG. 8A is a flow chart of virtual network identifying processing that is executed by the virtual network configuration calculating portion 37 according to the first embodiment of this invention.

The virtual network configuration calculating portion 37 executes Steps 302 to 315 for every piece of configuration information of the packet relay devices 10 that is stored in the configuration management database 42a (301).

The virtual network configuration calculating portion 37 first obtains configuration information of one of the packet relay devices 10 stored in the configuration management database 42a (302). The virtual network configuration calculating portion 37 then extracts virtual packet relay device identifiers and VLAN IDs from the obtained configuration information (303).

The virtual network configuration calculating portion 37 next determines whether or not any virtual packet relay device identifiers have been extracted in Step 303 (304).

This is because some packet relay devices 10 may constitute virtual networks themselves instead of generating the virtual packet relay devices 20, as in the case of the packet relay device 10d of FIG. 1. In the case of the packet relay device 10d, a virtual network identifier cannot be associated with virtual packet relay device identifiers, and the packet relay device 10d therefore requires different processing (processing of Steps 311 to 315) from processing of Steps 306 to 310 which associates a virtual network identifier with virtual packet relay device identifiers.

When it is determined in Step 304 that virtual packet relay device identifiers have been extracted in Step 303, the virtual network configuration calculating portion 37 selects as a processing target one of the virtual packet relay device identifiers extracted in Step 303, and executes Steps 303 to 310 (305). The virtual network configuration calculating portion 37 executes Steps 306 to 310 for every virtual packet relay device identifier extracted in Step 303.

The virtual network configuration calculating portion 37 first selects as a processing target one of VLAN IDs that are associated with the processing target virtual packet relay device identifier, and determines whether or not the selected processing target VLAN ID is registered in the virtual network configuration table 43a (306).

When it is determined in Step 306 that the processing target VLAN ID is registered in the virtual network configuration table 43a, the virtual network configuration calculating portion 37 refers to the virtual network configuration table 43a to set a virtual network identifier that is associated with the same VLAN ID as the processing target VLAN ID as the virtual network identifier of a virtual network whose constituents include the virtual packet relay device 20 that has the processing target virtual packet relay device identifier (307).

The virtual network configuration calculating portion 37 registers the virtual network identifier set in Step 307 in a new entry of the virtual network configuration table 43*a* in association with the processing target virtual packet relay device identifier and all VLAN IDs associated with the processing target virtual packet relay device identifier (310).

When it is determined in Step 306 that the processing target VLAN ID is not registered in the virtual network configuration table 43*a*, on the other hand, the virtual network configuration calculating portion 37 determines whether or not every VLAN ID that is associated with the processing target virtual packet relay device identifier has been selected (308).

When it is determined in Step 308 that every VLAN ID that is associated with the processing target virtual packet relay device identifier has been selected, the virtual network configuration calculating portion 37 generates a new virtual network identifier and sets the generated virtual network identifier as the virtual network identifier of a virtual network whose constituents include the virtual packet relay device 20 that has the processing target virtual packet relay device identifier (309).

This is because not all of VLANs that are the same as VLANs set to the virtual packet relay device 20 that is identified by the processing target virtual packet relay device identifier are present in the network, and the virtual network whose constituents include this virtual packet relay device 20 is an unregistered virtual network. Accordingly, a virtual network identifier needs to be newly generated for this virtual network.

Then the virtual network configuration calculating portion 37 proceeds to Step 310, where the virtual network identifier set in Step 309 is registered in a new entry of the virtual network configuration table 43*a* in association with the processing target virtual packet relay device identifier and all VLAN IDs associated with the processing target virtual packet relay device identifier.

When it is determined in Step 308 that not every VLAN ID that is associated with the processing target virtual packet relay device identifier has been selected, on the other hand, the virtual network configuration calculating portion 37 selects as a processing target VLAN ID another VLAN ID associated with the processing target virtual packet relay device identifier, and returns to Step 306.

In the case where Steps 306 to 310 have not been executed for every virtual packet relay device extracted in Step 303, the virtual network configuration calculating portion 37 returns to Step 306 to select the next packet relay device identifier and a VLAN ID associated with this packet relay device identifier, and executes Steps 306 to 310.

When executing Steps 306 to 310 is finished for every virtual packet relay device identifier extracted in Step 303 and executing Steps 302 to 315 is finished for every piece of configuration information of the packet relay devices 10 that is stored in the configuration management database 42*a*, the virtual network identifying processing is ended.

In the case where executing Steps 306 to 310 has been finished for every virtual packet relay device identifier extracted in Step 303 and executing Steps 302 to 315 has not been finished for every piece of configuration information of the packet relay devices 10 that is stored in the configuration management database 42*a*, the virtual network configuration calculating portion 37 returns to Step 302 to obtain configuration information of the next packet relay device 10 from pieces of configuration information of the packet relay devices 10 stored in the configuration management database 42*a*, and executes Steps 303 to 315.

Figure 8B:
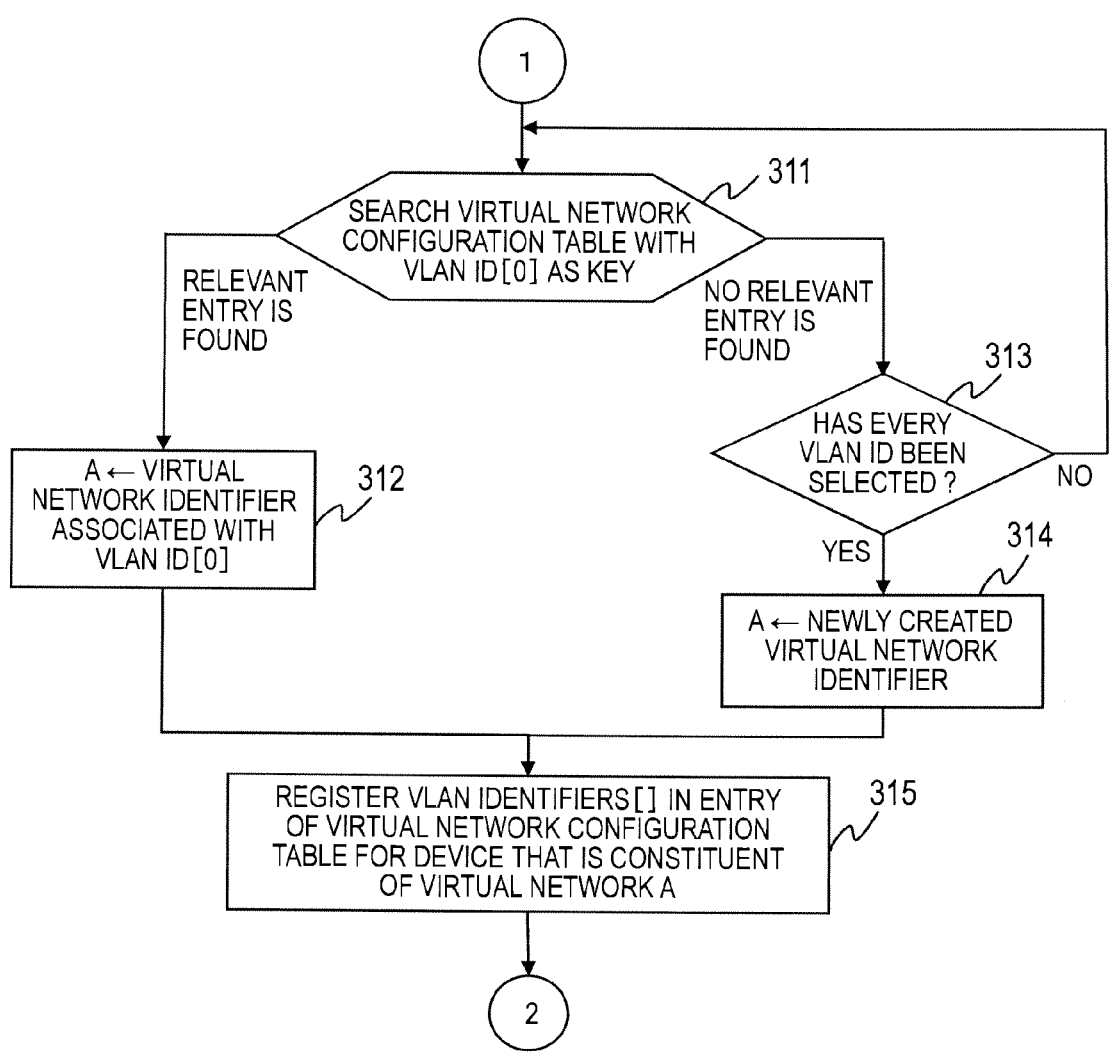
FIG. 8B is a flow chart of virtual network identifying processing according to the first embodiment of this invention.

A description is given next with reference to FIG. 8B on virtual network identifying processing that is executed when it is determined in Step 304 that no virtual packet relay device identifiers have been extracted in Step 303. FIG. 8B is a flow chart of virtual network identifying processing according to the first embodiment of this invention.

The virtual network configuration calculating portion 37 first selects as a processing target one of the VLAN IDs extracted in Step 303 and determines whether or not the selected processing target VLAN ID is registered in the virtual network configuration table 43*a* (311).

When it is determined in Step 311 that the processing target VLAN ID is registered in the virtual network configuration table 43*a*, the virtual network configuration calculating portion 37 refers to the virtual network configuration table 43*a* to set a virtual network identifier that is associated with the same VLAN ID as the processing target VLAN ID as the virtual network identifier of a virtual network whose constituents include the packet relay device 10 to which the processing target VLAN ID is set (312).

The virtual network configuration calculating portion 37 registers the virtual network identifier set in Step 312 in a new entry of the virtual network configuration table 43*a* in association with the packet relay device identifier of the packet relay device 10 whose configuration information has been obtained in Step 302 and all VLAN IDs associated with this packet relay device identifier (315).

When it is determined in Step 311 that the processing target VLAN ID is not registered in the virtual network configuration table 43*a*, on the other hand, the virtual network configuration calculating portion 37 determines whether or not every VLAN ID extracted in Step 303 has been selected (313).

When it is determined in Step 313 that every VLAN ID extracted in Step 303 has been selected, the virtual network configuration calculating portion 37 generates a new virtual network identifier and sets the generated virtual network identifier as the virtual network identifier of a virtual network whose constituents include the packet relay device 10 to which the processing target VLAN ID is set (314).

This is because not all of VLANs that are the same as VLANs set to the packet relay device 10 whose configuration information has been obtained in Step 302 are present in the network, and the virtual network whose constituents include this packet relay device 10 is an unregistered virtual network. Accordingly, a virtual network identifier needs to be newly generated for this virtual network.

The virtual network configuration calculating portion 37 then proceeds to Step 315 to register the virtual network identifier set in Step 314 in a new entry of the virtual network configuration table 43*a* in association with the packet relay device identifier of the packet relay device 10 whose configuration information has been obtained in Step 302 and all VLAN IDs associated with this packet relay device identifier.

When it is determined in Step 313 that not every VLAN ID extracted in Step 303 has been selected, on the other hand, the virtual network configuration calculating portion 37 selects as a processing target VLAN ID another VLAN ID extracted in Step 303, and returns to Step 311.

A more concrete description on the virtual network identifying processing described with reference to FIGS. 8A and 8B is given next, taking as an example the configuration management database 42*a* of FIG. 4 and the virtual network configuration table 43*a* of FIG. 5.

The premise here is that the virtual network configuration calculating portion 37 first obtains in Step 302 configuration information of the packet relay device 10*a* from the configuration management database 42*a*. In Step 303, the virtual network configuration calculating portion 37 extracts from the obtained configuration information "virtual packet relay device identifier: 100, VLAN ID: 10", "100, 100", "200, 20", and "200, 200".

The virtual packet relay device identifiers "100" and "200" have been extracted in Step 303, and hence the virtual network configuration calculating portion 37 determines in Step 304 that there are virtual packet relay device identifiers extracted, and proceeds to Step 305.

In Step 305, the virtual packet relay device identifier "100" is selected as a processing target virtual packet relay device identifier.

In Step 306, the virtual network configuration calculating portion 37 selects the VLAN ID "10" as a processing target ID and determines whether or not the VLAN ID "10" is registered in the virtual network configuration table 43*a*.

The virtual network configuration table 43*a* in this example has no values registered at this point. It is therefore determined in Step 306 that the VLAN ID "10" is not registered in the virtual network configuration table 43*a*, and the virtual network configuration calculating portion 37 proceeds to Step 308 to determine whether or not every one of VLAN IDs associated with the processing target virtual packet relay device identifier "100", namely, the VLAN IDs "10" and "100", has been selected.

The VLAN ID "100" has not been selected as a processing target VLAN ID yet. The virtual network configuration calculating portion 37 therefore selects the VLAN ID "100" as a processing target VLAN ID and returns to Step 306.

In Step 306, the virtual network configuration calculating portion 37 determines that the VLAN ID "100" is not registered in the virtual network configuration table 43*a* and proceeds to Step 308.

In Step 308, the virtual network configuration calculating portion 37 determines that every one of VLAN IDs associated with the processing target virtual packet relay device identifier "100", namely, the VLAN IDs "10" and "100", has been selected, and proceeds to Step 309.

In Step 309, a virtual network identifier "50*a*" is newly generated and, in Step 310, the virtual network identifier "50*a*" is registered in the virtual network configuration table 43*a* in association with the virtual packet relay device identifier "100" and the VLAN IDs "10" and "100" (entries 501 and 502 illustrated in FIG. 5).

Steps 305 to 310 are also executed for the virtual packet relay device identifier "200". The VLAN IDs "20" and "200" which are associated with the virtual packet relay device identifier "200" are not registered in the virtual network configuration table 43*a*, and a virtual network identifier "50*b*" is therefore newly generated in Step 309. In Step 310, the virtual network identifier "50*b*" is registered in the virtual network configuration table 43*a* in association with the virtual packet relay device identifier "200" and the VLAN IDs "20" and "200" (entries 505 and 506 illustrated in FIG. 5).

The premise here is that the virtual network configuration calculating portion 37 then obtains in Step 302 configuration information of the packet relay device 10*b* from the configuration management database 42*a*. In Step 303, the virtual network configuration calculating portion 37 extracts from the obtained configuration information "virtual packet relay device identifier: 100, VLAN ID: 10", "300, 20", and "300, 200".

Because the virtual packet relay device identifiers "100" and "300" have been extracted in Step 303, the virtual network configuration calculating portion 37 determines in Step 304 that there are virtual packet relay device identifiers extracted, and proceeds to Step 305.

In Step 305, the virtual packet relay device identifier "100" is selected as a processing target virtual packet relay device identifier.

In Step 306, the virtual network configuration calculating portion 37 selects the VLAN ID "10" as a processing target ID and determines whether or not the VLAN ID "10" is registered in the virtual network configuration table 43*a*.

The entries 501, 502, 505, and 506 have been registered in the virtual network configuration table 43*a* at this point.

With the VLAN ID "10" registered in the entry 501 of the virtual network configuration table 43*a*, the virtual network configuration calculating portion 37 proceeds to Step 307, where the virtual network identifier "50*a*" associated with the VLAN ID "10" is obtained as the virtual network identifier of a virtual network to which the virtual packet relay device of the packet relay device 10*b* that is identified by "100" belongs. In Step 310, the virtual network identifier "50*a*" is registered in the virtual network configuration table 43*a* in association with the virtual packet relay device identifier "100" and the VLAN ID "10" (an entry 503 illustrated in FIG. 5).

The virtual network configuration calculating portion 37 executes Steps 305 to 310 also for the virtual packet relay device identifier "300". The VLAN IDs "20" and "200" which are associated with the virtual packet relay device identifier "300" are registered in the entries 505 and 506 of the virtual network configuration table 43*a*. The virtual packet relay device identifier "300" is therefore registered in Step 307 in the virtual network configuration table 43*a* in association with the VLAN IDs "20" and "200" (entries 507 and 508 illustrated in FIG. 5).

It is premised here that the virtual network configuration calculating portion 37 next obtains in Step 302 configuration information of the packet relay device 10*d* from the configuration management database 42*a*. The virtual network configuration calculating portion 37 extracts "VLAN ID: 200" from the obtained configuration information in Step 303.

Because no virtual packet relay device identifiers have been extracted in Step 303, the virtual network configuration calculating portion 37 determines in Step 304 that there are no virtual packet relay device identifiers extracted, and proceeds to Step 311.

In Step 311, the VLAN ID "200" is selected as a processing target VLAN ID and whether or not the VLAN ID "200" is registered in the virtual network configuration table 43*a* is determined.

In this case, with the entries 506 and 508 being registered in the virtual network configuration table 43*a*, the virtual network configuration calculating portion 37 proceeds to Step 312, where the virtual network identifier "50*b*" associated with the VLAN ID "20" is obtained as the virtual network identifier of a virtual network to which the packet relay device 10*d* belongs. In Step 315, the virtual network identifier "50*b*" is registered in the virtual network configuration table 43*a* in association with the packet relay device identifier "10*d*" and the VLAN ID "200" (an entry 509 illustrated in FIG. 5).

By executing the processing described above for every packet relay device 10 that is managed by the management computer 30, the virtual network configuration table 43*a* of FIG. 5 is generated.

Executing the virtual network identifying processing of FIGS. 8A and 8B associates the same virtual network identifier with the virtual packet relay device identifiers of the virtual packet relay devices 20 that constitute the same virtual network even when different virtual packet relay device identifiers are set to the virtual packet relay devices 20 that constitute the virtual network. Virtual packet relay devices that constitute the same virtual network can thus be identified by referring to their virtual network identifier.

On the display device 44, a coupling relation is drawn between the packet relay devices 10 to which a VLAN ID associated with a virtual network identifier is set. The network administrator can thus readily see a coupling relation between the packet relay devices 10 that constitute the same virtual network.

Figure 9:
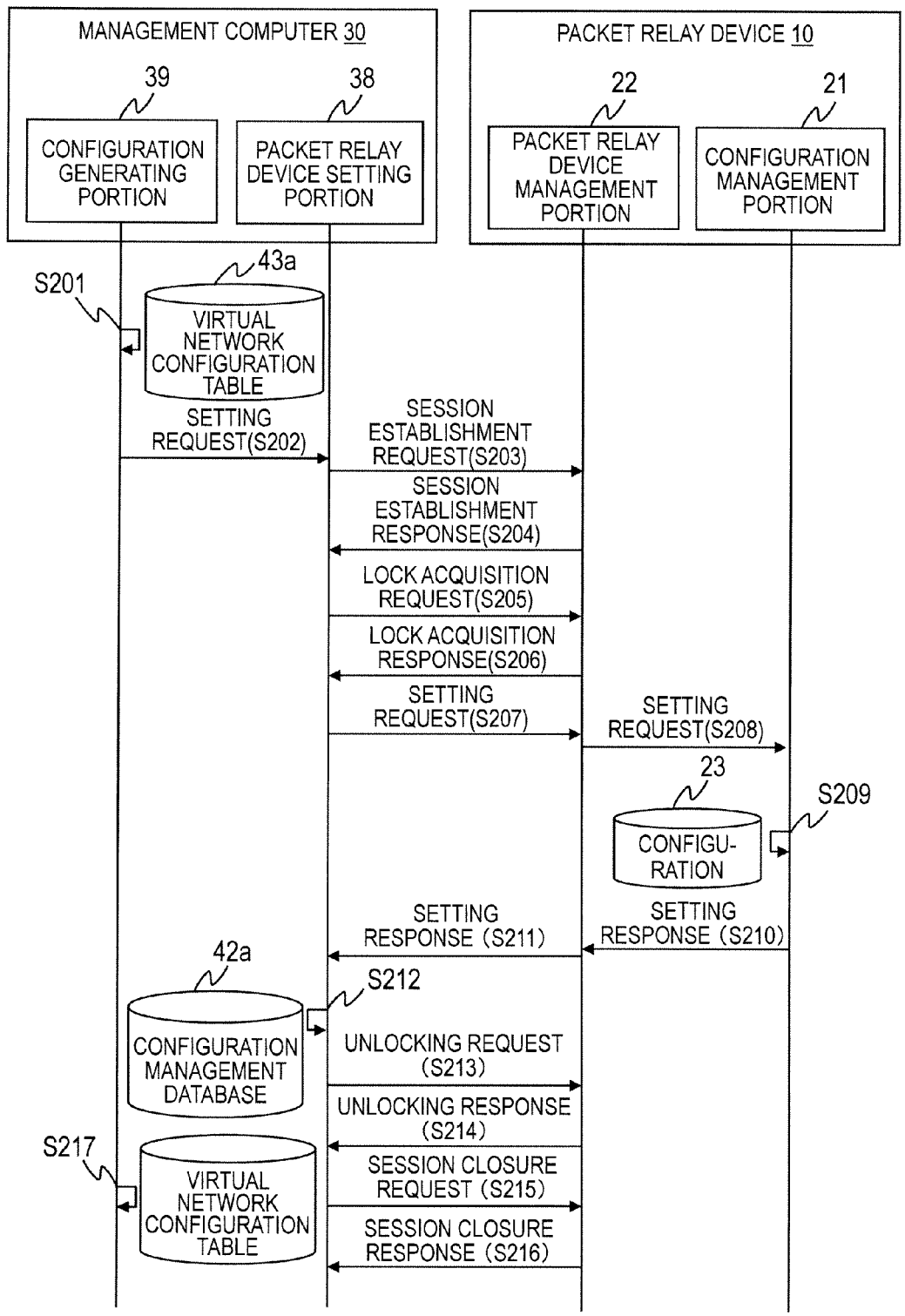
FIG. 9 is a sequence diagram of configuration information setting processing according to the first embodiment of this invention.

Described next with reference to FIG. 9 is configuration information setting processing in which the management computer 30 sets configuration information in one of the packet relay devices 10.

FIG. 9 is a sequence diagram of configuration information setting processing according to the first embodiment of this invention.

The network administrator or the configuration generating portion 39 inputs a request to set one of the packet relay devices 10 to the packet relay device setting portion 38 (S202).

For example, when an instruction to add a new packet relay device 10 is received from the network administrator via the network configuration display screen 800 of FIG. 6, the configuration generating portion 39 refers to the virtual network configuration table 43a to determine virtual packet relay device identifiers and VLAN IDs that are to be set to the new packet relay device 10 to be added (S201), and inputs to the packet relay device setting portion 38 a setting request for setting the determined virtual packet relay device identifiers and VLAN IDs in configuration information of the new packet relay device 10 to be added.

Details of the processing of S201 are described later with reference to FIG. 10.

Receiving an input of the setting request, the packet relay device setting portion 38 transmits a session establishment request to the packet relay device management portion 22 of the packet relay device 10 whose configuration information is to be set (S203).

The packet relay device management portion 22 determines whether or not a session can be established as in S102 of FIG. 7 and, when establishing a session is determined as possible, transmits a session establishment response to the packet relay device setting portion 38 of the management computer 30 (S204). As in S102 of FIG. 7, a session identifier is attached to packets that are communicated between the management computer 30 and the packet relay device 10 in question from then on.

Receiving the session establishment response from the packet relay device 10, the packet relay device setting portion 38 of the management computer 30 transmits to the packet relay device management portion 22 of the packet relay device 10 a lock acquisition request which is a request to set an exclusive setting privilege to the configuration 23 of the packet relay device 10 with which the session has been established (S205). When an exclusive setting privilege (a lock) is set to the configuration 23 of a particular packet relay device 10, other devices than the management computer 30 which is granted the exclusive setting privilege cannot set this configuration 23, and only the management computer 30 which is granted the exclusive setting privilege is allowed to set this configuration 23.

The packet relay device management portion 22 determines whether or not an exclusive setting privilege can be set to the configuration 23 and, when setting an exclusive setting privilege to the configuration 23 is determined as possible, transmits a lock acquisition response to the packet relay device setting portion 38 of the management computer 30 (S206).

Setting an exclusive setting privilege to the configuration 23 is determined as impossible when, for example, there is an exclusive setting privilege already set to the configuration 23, and is determined as possible in the case where no prior exclusive setting privilege is set to the configuration 23.

Receiving the lock acquisition response from the packet relay device 10, the packet relay device setting portion 38 transmits to the packet relay device management portion 22 of the packet relay device 10 the setting request which has been input in S202 (S207).

Receiving an input of the setting request, the packet relay device management portion 22 inputs the received setting request to the configuration management portion 21 (S208).

Receiving an input of the setting request, the configuration management portion 21 updates the configuration 23 based on the input setting request (S209). The configuration management portion 21 then inputs a setting response which includes the updated configuration information to the packet relay device management portion 22 (S210).

Receiving an input of the setting response, the packet relay device management portion 22 transmits the input response to the packet relay device setting portion 38 of the management computer 30 (S211).

Receiving the setting response, the packet relay device setting portion 38 of the management computer 30 updates the configuration management database 42a based on the updated configuration information which is included in the received setting response (S212).

The packet relay device setting portion 38 also transmits to the packet relay device management portion 22 of the packet relay device 10 an unlocking request which is a request to dissolve the exclusive setting privilege set to the configuration 23 of the packet relay device 10 (S213).

The packet relay device management portion 22 determines whether or not the exclusive setting privilege set to the configuration 23 can be dissolved and, when dissolving the exclusive setting privilege is determined as possible, dissolves the exclusive setting privilege and transmits an unlocking response to the packet relay device setting portion 38 (S214).

Receiving the unlocking response from the packet relay device 10, the packet relay device setting portion 38 transmits to the packet relay device management portion 22 of the packet relay device 10 a session closure request which is a request to close a session (S215).

Receiving the session closure request from the management computer 30, the packet relay device management portion 22 closes the session and transmits a session closure response to the packet relay device setting portion 38 of the management computer 30 (S216).

Thereafter, the configuration generating portion 39 refers to the configuration management database 42a to update the virtual network configuration table 43a based on the set configuration information of the packet relay device 10 (S217).

Specifically, in the case where the virtual packet relay device identifier 200 and the VLAN identifier 100 are set to a packet relay device 10c, the fact that the virtual packet relay device identifier 200 and the VLAN identifier 100 have been set to the set packet relay device 10c is registered in the configuration management database 42a in S212, and an entry for the virtual packet relay device of the packet relay device 10c that is identified by "200" is registered in S217 as a new entry of the virtual network configuration table 43a.

The processing of S201 of FIG. 9, namely, configuration information determining processing for determining configuration information (virtual packet relay device identifiers and VLAN IDs) to be set to the new packet relay device 10 to be added, is described next with reference to FIG. 10.

Figure 10:
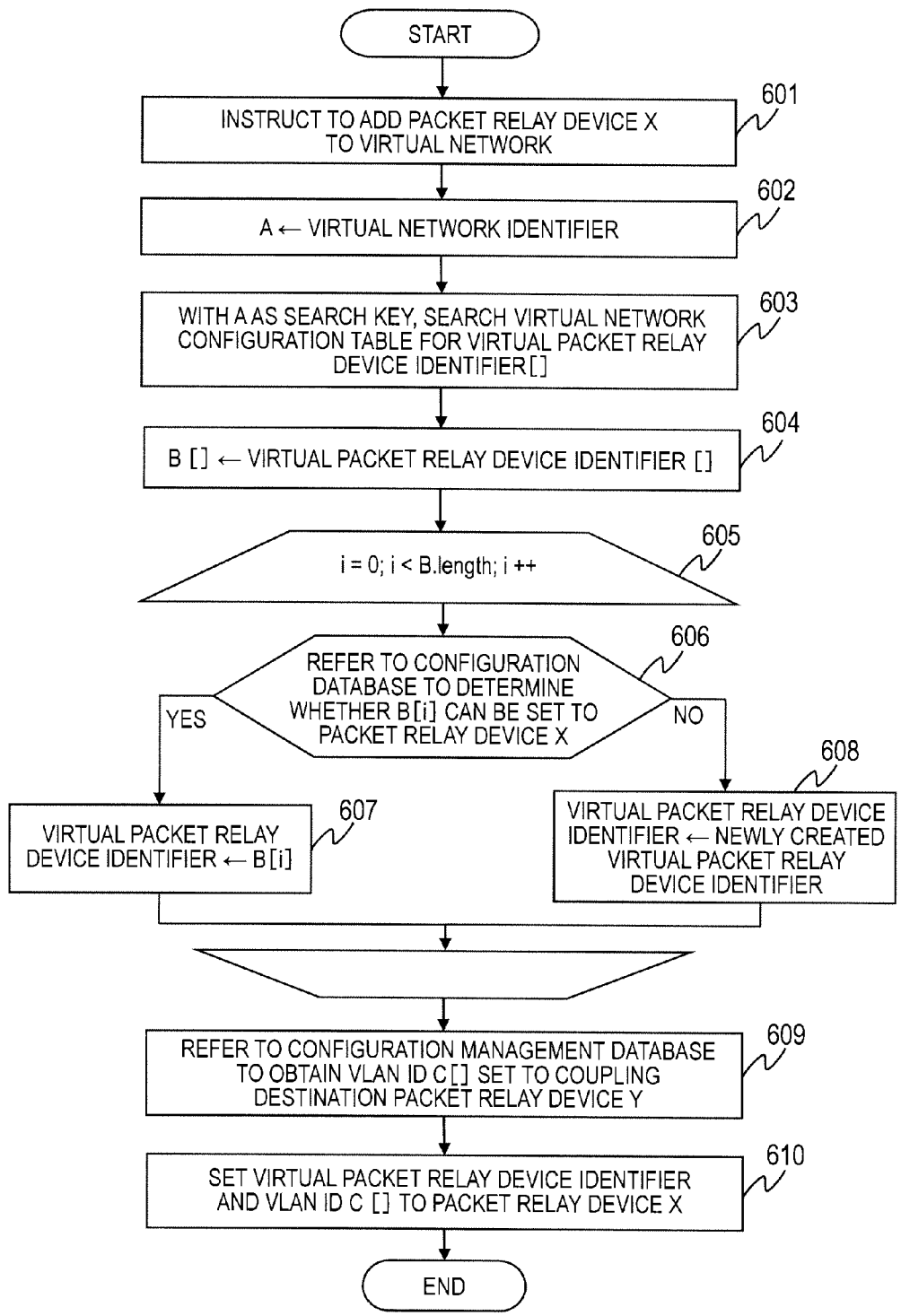
FIG. 10 is a flow chart of configuration information determining processing according to the first embodiment of this invention.

FIG. 10 is a flow chart of configuration information determining processing according to the first embodiment of this invention.

The configuration information determining processing is executed by the configuration generating portion 39 of the management computer 30.

The configuration generating portion 39 first receives an instruction to add a packet relay device X which is input by the network administrator via the network configuration display screen 800 (illustrated in FIG. 6) (601). The addition instruction includes the virtual network identifier of a virtual network to which the packet relay device X is added, the packet relay device identifier of a packet relay device, which is a coupling destination to which the new packet relay device X to be added is coupled (a coupling destination packet relay device identifier), and the identifier of one of the packet transmission/reception ports 14 included in the coupling destination packet relay device, which is a coupling destination to which the packet relay device X is newly coupled (a coupling destination packet transmission/reception port identifier).

The included virtual network identifier is the identifier of a virtual network that has been selected in the virtual network list display area 810 when the "add" button 831 is operated on the network configuration display screen 800 of FIG. 6.

The coupling destination packet relay device identifier is the packet relay device identifier of the packet relay device 10 that has been selected in the network topology display area 820 when the "add" button 831 is operated.

The coupling destination packet transmission/reception port identifier is the packet transmission/reception port identifier of the packet transmission/reception port 14 that has been selected in the network topology display area 820 when the "add" button 831 is operated.

The configuration generating portion 39 next refers to the received addition instruction to identify the identifier of a virtual network to which the packet relay device X is to be added (602).

The configuration generating portion 39 then identifies an entry of the virtual network configuration table 43a in which the virtual packet relay device identifier identified in Step 602 is registered as the virtual network identifier 431, and obtains each virtual packet relay device identifier that is registered as the virtual packet relay device identifier 433 in the obtained entry (603).

The configuration generating portion 39 stores each virtual packet relay device identifier obtained in Step 603 in an array (604).

The configuration generating portion 39 next selects as a processing target virtual packet relay device identifier one of the virtual packet relay device identifiers stored in the array in Step 604, and executes Steps 606 to 608 for every virtual packet relay device identifier stored in the array in Step 604 (605).

The configuration generating portion 39 first refers to the configuration management database 42a to obtain configuration information of the new packet relay device X to be added. The configuration generating portion 39 refers to the obtained configuration information of the packet relay device X to determine whether or not the processing target virtual packet relay device identifier can be set to the packet relay device X (606).

Specifically, the configuration generating portion 39 determines whether or not the processing target virtual packet relay device identifier is already used as a virtual packet relay device identifier generated in the packet relay device X, and whether or not the processing target virtual packet relay device identifier is a virtual packet relay device identifier that can be set by the packet relay device X.

A virtual packet relay device identifier that can be set by the packet relay device X is identified from the model number of the packet relay device X.

When it is determined in Step 606 that the processing target virtual packet relay device identifier can be set to the packet relay device X, the configuration generating portion 39 determines that the processing target virtual packet relay device identifier is to be allocated to a virtual packet relay device newly generated by the packet relay device X (607).

When it is determined in Step 606 that the processing target virtual packet relay device identifier cannot be set to the packet relay device X, on the other hand, the configuration generating portion 39 generates a new virtual packet relay device identifier and determines that the generated virtual packet relay device identifier is to be allocated to a virtual packet relay device newly generated by the packet relay device X (608).

When executing Steps 606 to 608 is finished for every virtual packet relay device identifier stored in the array in Step 604, the configuration generating portion 39 refers to the configuration management database 42a to obtain configuration information of a coupling destination packet relay device Y, which is identified by the coupling destination virtual packet relay device identifier included in the addition instruction. The configuration generating portion 39 refers to the obtained configuration information of the coupling destination packet relay device Y to obtain a VLAN ID set to a coupling destination packet transmission/reception port which is one of the packet transmission/reception ports 14 included in the coupling destination packet relay device Y and to which the new packet relay device X to be added is coupled. The obtained VLAN ID is determined as a VLAN ID to be set to the packet relay device X (609).

The configuration management database 42a here associates a VLAN ID with the port identifier of one of the packet transmission/reception ports 14 included in the packet relay device 10 to which the VLAN ID is set. The configuration generating portion 39 thus obtains from the obtained configuration information of the coupling destination packet relay device Y a VLAN ID that is associated with the packet transmission/reception port identifier corresponding to the coupling destination packet transmission/reception port identifier included in the addition instruction.

The configuration generating portion 39 next inputs to the packet relay device setting portion 38 a setting request for setting the virtual packet relay device identifier determined in Step 607 or 608 and the VLAN ID determined in Step 609 in the configuration information of the packet relay device X (610), and ends the configuration information determining processing.

In the manner described above, a new packet relay device 10 is added to a virtual network by automatically setting the virtual packet relay device identifiers and VLAN IDs of the virtual packet relay devices 20 that are generated in the added packet relay device 10. The network administrator can thus construct a virtual network without needing to be aware of the virtual packet relay device identifiers and VLAN IDs of the virtual packet relay devices 20 that are generated in the new packet relay device 10 to be added.

The configuration information determination processing is described next taking as an example the case where the packet relay device 10c is added to the virtual network 50a.

In Step 602, the configuration generating portion 39 identifies "50a" as the virtual network identifier of a virtual network to which the packet relay device 10c is added.

In Step 603, the configuration generating portion 39 refers to the virtual network configuration table 43a to identify entries in which the virtual network identifier "50a" is registered (the entries 501 to 503 of FIG. 5), and obtains the virtual packet relay device identifier "100" from the identified entries. The virtual packet relay device identifier "100" is stored in an array in Step 604.

The configuration generating portion 39 determines in Step 606 whether or not the virtual packet relay device identifier "100" can be set to the packet relay device 10c. In this example, it is determined that the virtual packet relay device identifier "100" cannot be set to the packet relay device 10c and the configuration generating portion 39 proceeds to Step 608.

In Step 608, the configuration generating portion 39 generates a new virtual packet relay device identifier "200" and determines that the virtual packet relay device identifier "200" is to be allocated to a virtual packet relay device generated in the packet relay device 10c.

In Step 609, the configuration generating portion 39 obtains the VLAN ID "100" associated with the coupling destination packet transmission/reception port which is one of the packet transmission/reception ports 14 included in the packet relay device 10a, which is the coupling destination of the packet relay device 10c, and which is coupled to the packet relay device 10c.

In Step 610, the configuration generating portion 39 inputs to the packet relay device setting portion 38 a setting request for setting the virtual packet relay device identifier "200" and the VLAN ID "100" to the packet relay device 10c.

Figure 11:
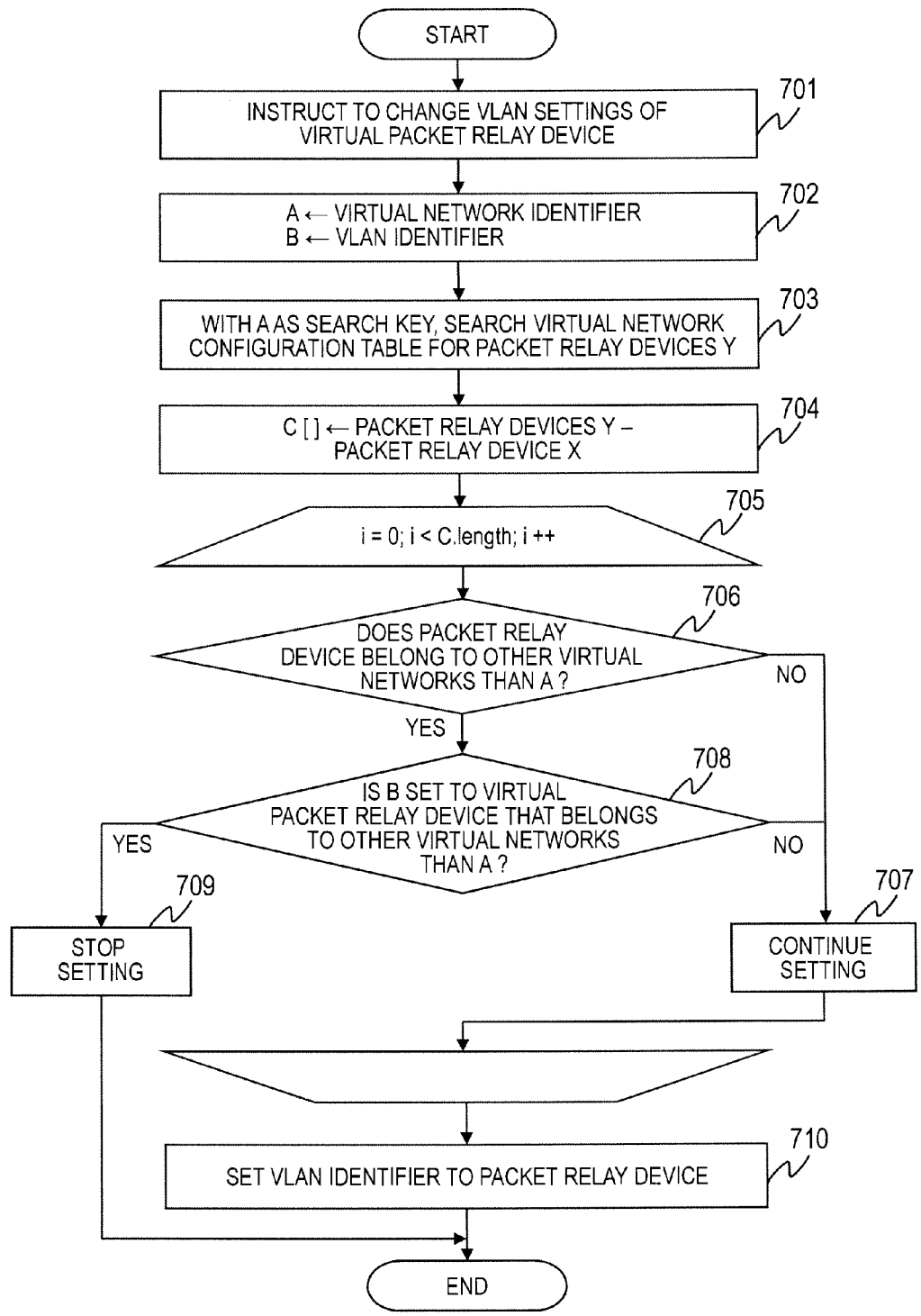
FIG. 11 is a flow chart of erroneous settings detection processing according to the first embodiment of this invention.

Described next with reference to FIG. 11 is erroneous settings detection processing which is executed when the configuration generating portion 39 receives a setting request from the network administrator.

FIG. 11 is a flow chart of erroneous settings detection processing according to the first embodiment of this invention.

The network administrator can input, via a not-shown setting screen, to the management computer 30, a setting request for setting a VLAN ID to the virtual packet relay device 20 that is a constituent of a given virtual network.

In the case where the VLAN ID to be set has been set to the virtual packet relay device 20 that is a constituent of another virtual network that is different from the setting target virtual network, this VLAN ID cannot be set to the setting target virtual packet relay device 20. Setting this VLAN ID to the setting target virtual packet relay device 20 means that the same VLAN ID is assigned to the virtual packet relay devices 20 that belong to different virtual networks and are not allowed to communicate with each other, and therefore is erroneous settings on the part of the administrator.

An example is given with reference to FIG. 1 in which the network administrator issues a request to set a VLAN ID 300 to the packet relay device 10b (the virtual packet relay device 20d, virtual packet relay device identifier: 300) which is a constituent of the virtual network 50b when the VLAN ID 300 has been set to the packet relay device 10a (the virtual packet relay device 20a, virtual packet relay device identifier: 100) which is a constituent of the virtual network 50a. It is a possibility in this case that the virtual packet relay device 20a and the virtual packet relay device 20d which really belong to different virtual networks communicate information over a VLAN identified by the VLAN ID 300. In other words, there is a possibility that information of the virtual network 50a and information of the virtual network 50b which are supposed to be separate from each other are mixed up.

The erroneous settings detection processing is for detecting erroneous settings on the part of the network administrator as the one described above.

The configuration generating portion 39 first receives a setting request from the network administrator (701). The setting request includes the virtual packet relay device identifier of the setting target virtual packet relay device 20 (a setting target virtual packet relay device identifier), the packet relay device identifier of the packet relay device 10 in which the setting target virtual packet relay device 20 is generated (a setting target packet relay device identifier), and a VLAN ID to be set to this virtual packet relay device (a setting requested VLAN ID).

The configuration generating portion 39 next refers to the virtual network configuration table 43a to identify the virtual network identifier of a virtual network whose constituents include the setting target virtual packet relay device 20, and identifies the setting requested VLAN ID included in the setting request (702).

The configuration generating portion 39 then searches the virtual network configuration table 43a for a packet relay device identifier that is associated with the setting target virtual network identifier (703).

The configuration generating portion 39 stores packet relay device identifiers found in the search of Step 703, except the setting target packet relay device identifier, in an array (704).

The configuration generating portion 39 next selects as a processing target one of the packet relay device identifiers stored in the array to execute Steps 706 to 709 (705). Steps 706 to 709 are repeatedly executed until it is determined for any one of the packet relay device identifiers that the setting is to be stopped, or until it is determined for every packet relay device identifier stored in the array that the setting is to be continued.

The configuration generating portion 39 refers to the virtual network configuration table 43a to determine whether or not the processing target packet relay device identifier is associated with another virtual network identifier that is different from the one identified in Step 702 (706).

When it is determined in Step 706 that the processing target packet relay device identifier is not associated with another virtual network identifier that is different from the one identified in Step 702 (other virtual network identifiers), the configuration generating portion 39 determines that the setting is to be continued (707) and, in the case where executing Steps 706 to 708 has not been finished for every packet relay device identifier stored in the array, selects another packet relay device identifier as the processing target packet relay device identifier to execute Step 706. In the case where it is determined for every packet relay device identifier stored in the array that the setting is to be continued, the configuration generating portion 39 inputs to the packet relay device setting portion 38 a setting request for setting the setting requested VLAN ID in configuration information of the packet relay device that has generated the setting target virtual packet relay device 20 (710), and ends the erroneous settings detection processing.

When it is determined in Step 706 that the processing target packet relay device identifier is associated with the other virtual network identifiers, on the other hand, the configuration generating portion 39 refers to the virtual network configuration table 43a to determine whether or not the virtual packet relay devices 20 generated in the packet relay device 10 that is identified by the processing target packet relay device identifier (processing target virtual packet relay devices 20) include the virtual packet relay device 20 that constitutes a virtual network identified by another virtual network identifier (another virtual network) and to which the setting requested VLAN ID is set (708).

Specifically, the configuration generating portion 39 identifies an entry of the virtual network configuration table 43a in which one of the other virtual network identifies is registered as the virtual network identifier 431 and the processing target packet relay device identifier is registered as the packet relay device identifier 432. The configuration generating portion 39 determines whether or not the setting requested VLAN ID is registered as the VLAN ID 434 in the identified entry.

When it is determined in Step 708 that the setting requested VLAN ID has been set to the processing target virtual packet relay devices 20 that constitute other virtual networks, it means that the setting requested VLAN ID has been set to virtual networks other than the setting target virtual network. The configuration generating portion 39 accordingly determines that setting the setting requested VLAN ID is erroneous settings and that the setting is to be stopped (709), and ends the erroneous settings detection processing.

When it is determined in Step 708 that the setting requested VLAN ID has not been set to the processing target virtual packet relay devices 20 that constitute other virtual networks, on the other hand, the configuration generating portion 39 proceeds to Step 707 to determine that the setting is to be continued.

Setting a wrong VLAN ID to a virtual packet relay device is thus prevented in the manner described above.

The following description of the erroneous settings detection processing takes as an example a case where the VLAN ID 100 is set to the virtual packet relay device 20d (virtual packet relay device identifier: 300) which is generated in the packet relay device 10b of FIG. 1.

The configuration generating portion 39 identifies in Step 702 the virtual network 50b as a virtual network whose constituents include the virtual packet relay device 20d, and "100" as the setting requested VLAN ID.

In Step 703, the configuration generating portion 39 searches for the packet relay device identifiers "10a", "10b", and "10d" which are associated with the setting target virtual network identifier "50b".

In Step 704, the configuration generating portion 39 stores in an array the packet relay device identifiers "10a" and "10d" as packet relay device identifiers that remain after excluding the setting target packet relay device identifier "10b from the packet relay device identifiers "10a", "10b", and "10d" which are found in the search of Step 703".

In Step 705, the configuration generating portion 39 selects the packet relay device identifier "10a" as a processing target.

In Step 706, the configuration generating portion 39 determines that the packet relay device identifier "10a" is associated with other virtual network identifiers, specifically, 50a, and proceeds to Step 708.

In Step 708, the configuration generating portion 39 determines that the setting requested VLAN ID "100" has been registered to the virtual packet relay device 20a (virtual packet relay device identifier: 100) which is generated in the packet relay device 10a, proceeds to Step 709, determines that the setting is to be stopped, and ends the erroneous settings detection processing.

Setting the VLAN ID 100 to the virtual packet relay device 20d (virtual packet relay device identifier: 300) which is a constituent of the virtual network 50b can lead to a mix-up of information of the virtual network 50a and information of the virtual network 50b via the VLAN identified by the VLAN ID 100. It is therefore determined in Step 709 that the setting is to be stopped, and thus the execution of Step 710 is prevented.

Second Embodiment

A second embodiment is described with reference to FIGS. 12 to 21.

The first embodiment deals with a case where a second network which is a virtual network set to one of the first networks is a VLAN. The second embodiment describes a case where the second network is constructed by associating the virtual packet relay devices 20 and the packet transmission/reception ports 14.

Figure 12:
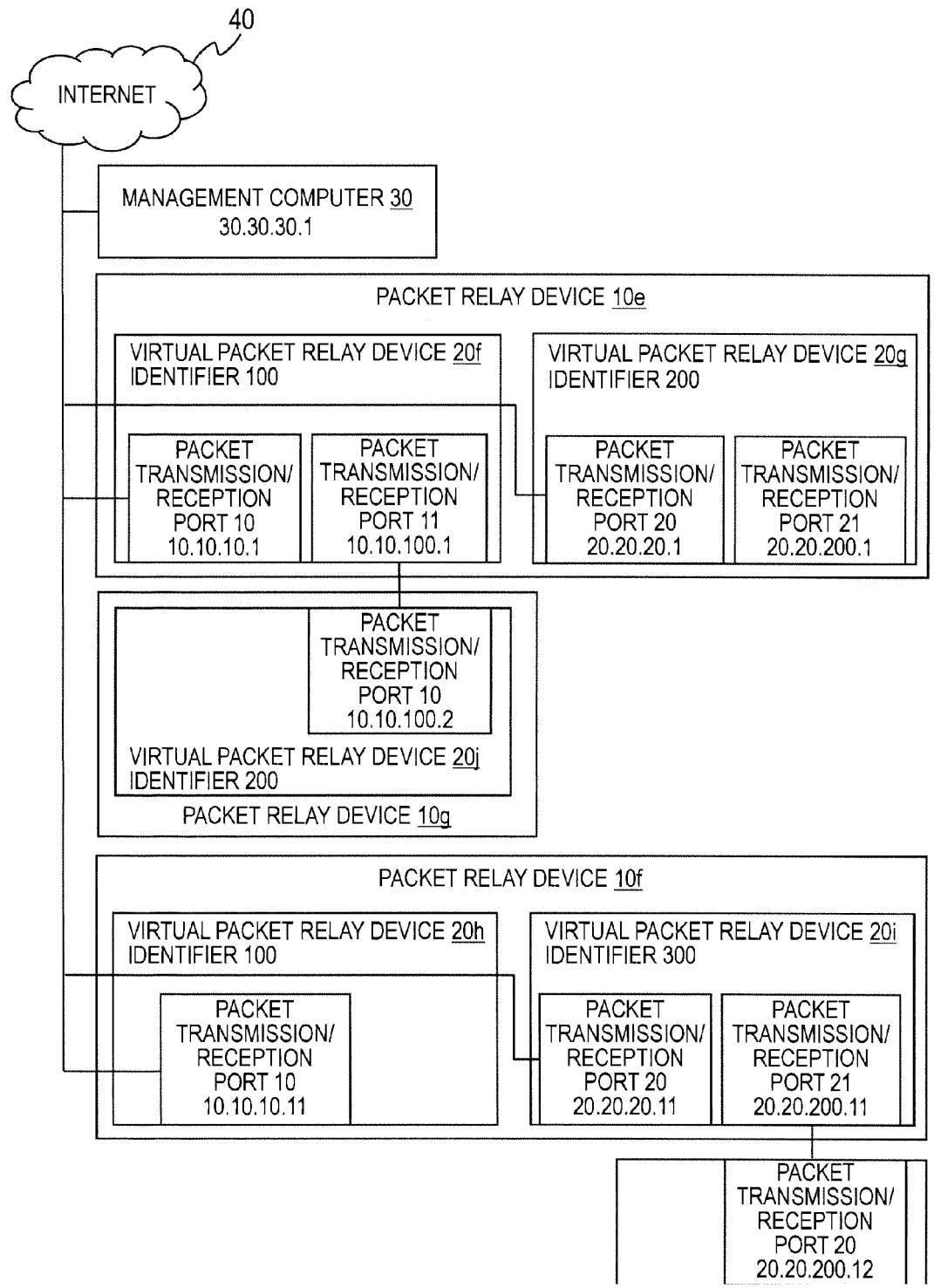
FIG. 12 is a network configuration diagram of the network management system according to a second embodiment of this invention.

FIG. 12 is a network configuration diagram of a network management system according to the second embodiment of this invention. The description given here is focused on differences of the network management system of this embodiment from the network management system of the first embodiment which is illustrated in FIG. 1.

The network management system includes packet relay devices 10e to 10h and the management computer 30.

Virtual packet relay devices 20f and 20g operate on the packet relay device 10e, virtual packet relay devices 20h and 20i operate on the packet relay device 10f, and a virtual packet relay device 20j operates on the virtual packet relay device 10g.

The virtual packet relay device 20f is associated with packet transmission/reception ports "10" and "11" that are included in the packet relay device 10e. The virtual packet relay device 20g is associated with packet transmission/reception ports "20" and "21" that are included in the packet relay device 10e.

The virtual packet relay device 20g is associated with a packet transmission/reception port "10" that is included in the packet relay device 10g.

Further, the virtual packet relay device 20h is associated with packet transmission/reception port "10" that is included in the packet relay device 10f. The virtual packet relay device 20i is associated with packet transmission/reception ports "20" and "21" that are included in the packet relay device 10f.

A parenthesized number immediately following each packet transmission/reception port 14 is a packet transmission/reception port identifier which is the identifier of the packet transmission/reception port 14. The packet transmission/reception port identifier of each packet transmission/reception port 14 is unique throughout the packet relay device 10 that has the packet transmission/reception port 14 in question.

The packet transmission/reception ports 14 that are associated with the virtual packet relay devices 20 are referred to as the packet transmission/reception ports 14 that belong to the virtual packet relay devices 20.

Coupling the packet transmission/reception port 14 that belongs to one virtual packet relay device 20 to the packet transmission/reception port 14 that belongs to another virtual packet relay device 20 links the virtual packet relay devices 20 to each other. This way, a plurality of virtual networks (first networks) is constructed in a single physical network.

In FIG. 12, the virtual packet relay device 20f, the virtual packet relay device 20h, and the virtual packet relay device 20j constitute one virtual network (hereinafter referred to as virtual network C). The virtual packet relay device 20g, the virtual packet relay device 20i, and the virtual packet relay device 20h constitute one virtual network (hereinafter referred to as virtual network D). Two virtual networks (first networks) are thus constructed in a single physical network.

In the virtual network C, a packet transmission/reception port "11" that belongs to the virtual packet relay device 20*f* and the packet transmission/reception port "10" that belongs to the virtual packet relay device 20*j* are coupled to each other, and the packet transmission/reception port "10" that belongs to the virtual packet relay device 20*f* and the packet transmission/reception port "10" that belongs to the virtual packet relay device 20*h* are coupled to each other. The virtual network C is therefore divided into a network (the second network) between the packet transmission/reception port "11" that belongs to the virtual packet relay device 20*f* and the packet transmission/reception port "10" that belongs to the virtual packet relay device 20*j*, and a network between the packet transmission/reception port "10" that belongs to the virtual packet relay device 20*f* and the packet transmission/reception port "10" that belongs to the virtual packet relay device 20*h*.

Further, in the virtual network D, a packet transmission/reception port "20" that belongs to the virtual packet relay device 20*g* and the packet transmission/reception port "20" that belongs to the virtual packet relay device 20*i* are coupled to each other, and the packet transmission/reception port "21" that belongs to the virtual packet relay device 20*i* and the packet transmission/reception port "20" that belongs to the packet relay device 10*h* are coupled to each other. The virtual network D is therefore divided into a network between the packet transmission/reception port "20" that belongs to the virtual packet relay device 20*g* and the packet transmission/reception port "20" that belongs to the virtual packet relay device 20*i*, and a network between the packet transmission/reception port "21" that belongs to the virtual packet relay device 20*i* and the packet transmission/reception port "20" that belongs to the packet relay device 10*h*.

Figure 13:
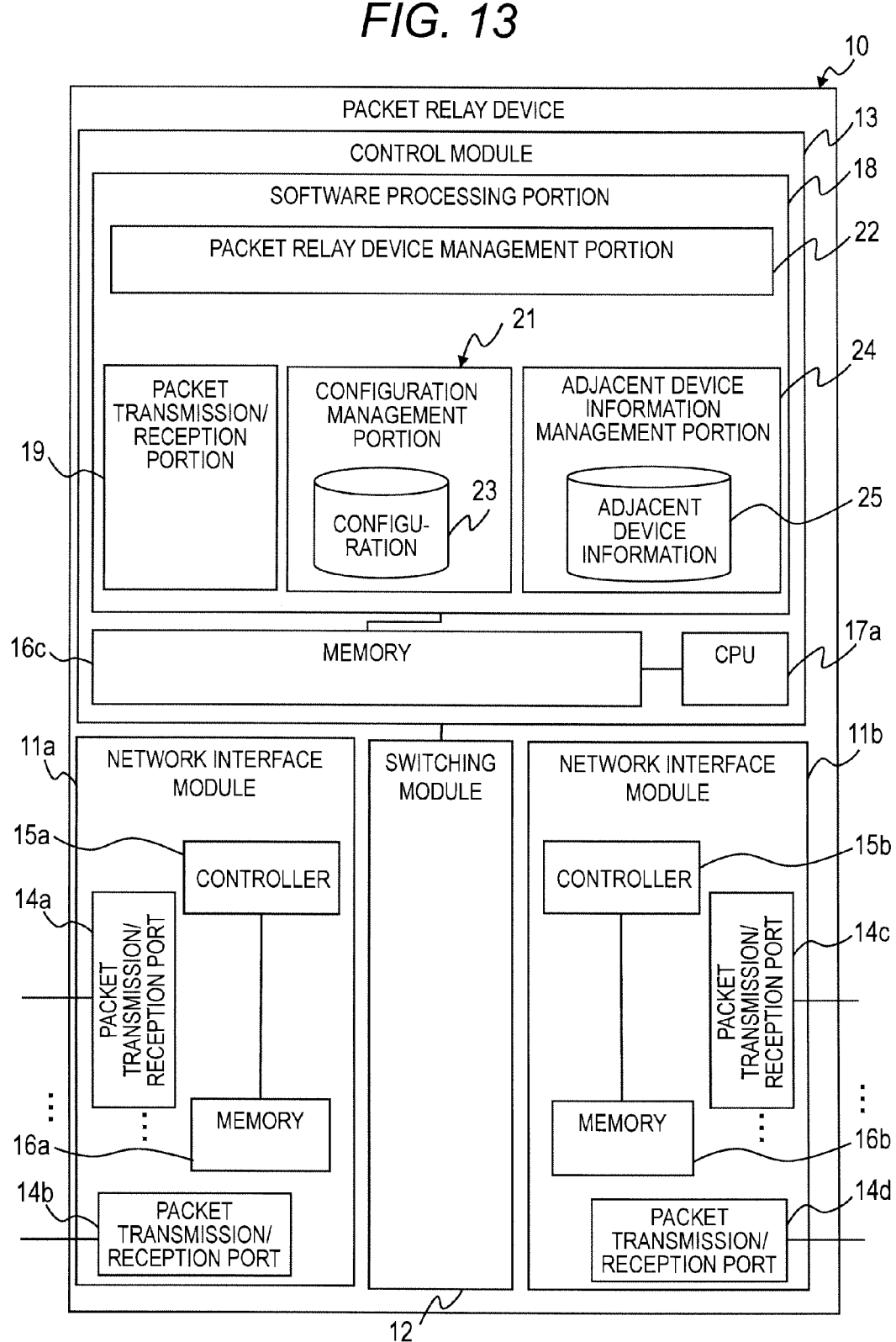
FIG. 13 is a block diagram illustrating the configuration of the packet relay devices according to the second embodiment of this invention.

FIG. 13 is a block diagram illustrating the configuration of the packet relay devices 10 according to the second embodiment of this invention. In FIG. 13, components that are the same as those of the packet relay devices 10 of the first embodiment which are illustrated in FIG. 2 are denoted by the same reference symbols in order to omit their descriptions.

The packet relay devices 10 of this embodiment have a configuration that is obtained by adding an adjacent device information management portion 24 and adjacent device information 25 to the configuration of the packet relay devices 10 of the first embodiment.

The adjacent device information management portion 24 manages the adjacent device information 25. The adjacent device information 25 holds the relation between an adjacent packet relay device identifier as the identifier of the packet relay device 10 (an adjacent packet relay device) to which one of the packet transmission/reception ports 14 included in its own packet relay device is coupled and a packet transmission/reception port identifier as the identifier of the coupling destination packet transmission/reception port 14.

Each packet relay device 10 collects the adjacent device information 25 by exchanging information that includes a packet relay device identifier and a packet transmission/reception port identifier with its adjacent packet relay device.

Figure 14:
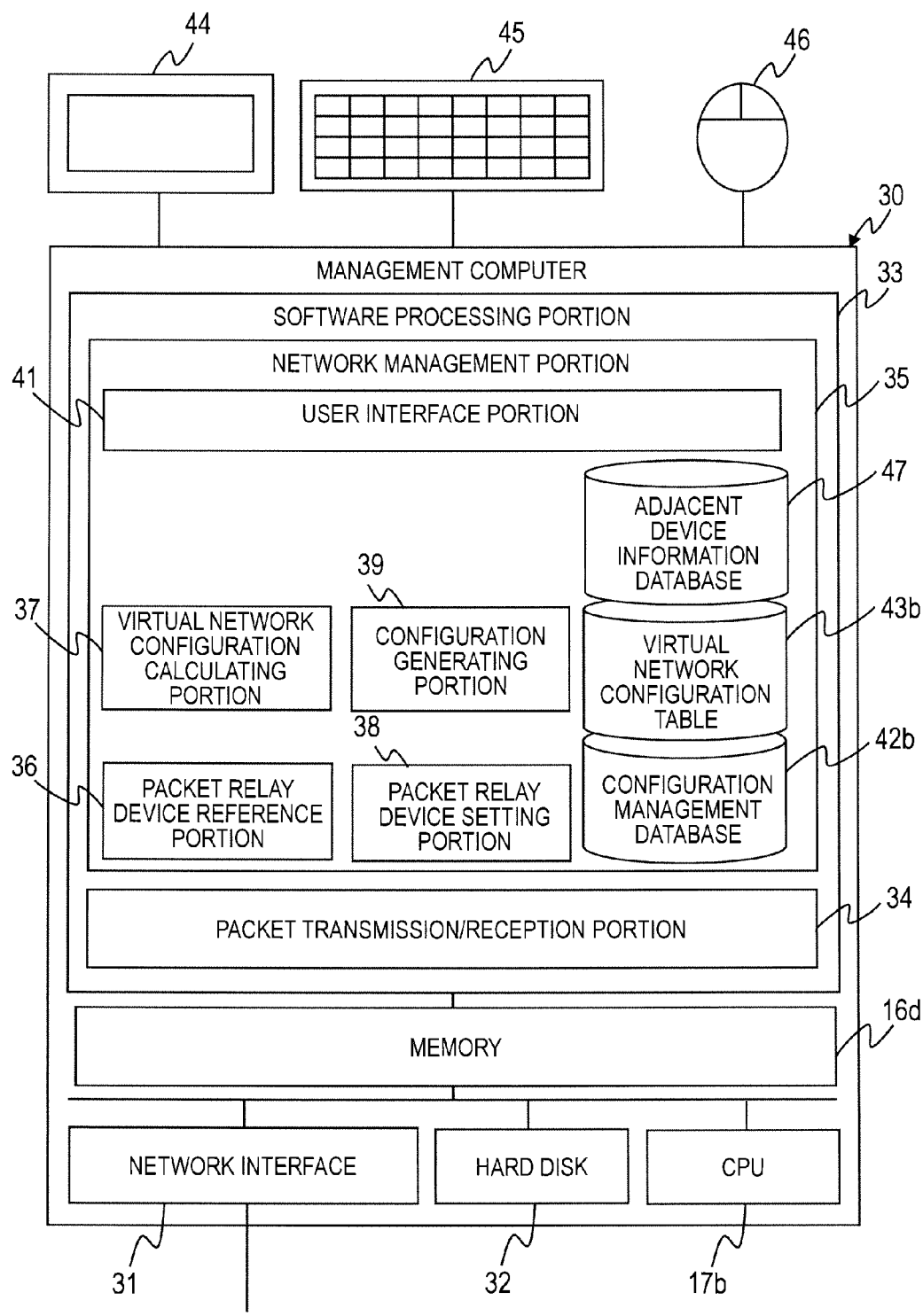
FIG. 14 is a block diagram illustrating a configuration of the management computer according to the second embodiment of this invention.

FIG. 14 is a block diagram illustrating the configuration of the management computer 30 according to the second embodiment of this invention. In FIG. 14, components that are the same as those of the management computer 30 of the first embodiment which is illustrated in FIG. 3 are denoted by the same reference symbols in order to omit their descriptions.

The management computer 30 of this embodiment has a configuration that is obtained by adding an adjacent device information database 47 to the configuration of the management computer 30 of the first embodiment.

The adjacent device information database 47 stores the adjacent device information 25 of each packet relay device 10 which is obtained by the management computer 30. Details of the adjacent device information database 47 are described later with reference to FIG. 16.

FIG. 15 is an explanatory diagram of a configuration management database 42*b* according to the second embodiment of this invention.

The configuration management database 42*b* includes a packet transmission/reception port 424 in place of the VLAN ID 423 of the configuration management database 42*a* illustrated in FIG. 4.

Registered as the packet transmission/reception port 424 is the packet transmission/reception port identifier of the packet transmission/reception port 14 that belongs to one of the virtual packet relay devices 20.

FIG. 16 is an explanatory diagram of the adjacent device information database 47 according to the second embodiment of this invention.

The adjacent device information database 47 includes a packet relay device 471, a packet transmission/reception port identifier 472, an adjacent packet relay device 473, and a packet transmission/reception port 474.

Registered as the packet relay device 471 is the identifier of the packet relay device 10 from which the adjacent device information 25 in question has been obtained. Registered as the packet transmission/reception port 472 is the identifier of one of the packet transmission/reception ports 14 of the packet relay device 10 from which this piece of adjacent device information 25 has been obtained.

Registered as the adjacent packet relay device 473 is the identifier of an adjacent packet relay device that is coupled to the packet transmission/reception port 14 of the packet relay device 10 from which this piece of adjacent device information 25 has been obtained. Registered as the packet transmission/reception port 474 is the identifier of the packet transmission/reception port 14 that is connected to the packet transmission/reception port 14 of the packet relay device 10 from which this piece of adjacent device information 25 has been obtained, from among the packet transmission/reception ports 14 included in the adjacent packet relay device.

FIG. 17 is an explanatory diagram of a virtual network configuration table 43*b* according to the second embodiment of this invention.

The virtual network configuration table 43*b* includes a packet transmission/reception port 435 in place of the VLAN ID 434 of the virtual network configuration table 43*a* of the first embodiment which is illustrated in FIG. 5.

Registered as the packet transmission/reception port 435 is a packet transmission/reception port identifier that is associated with a virtual network identifier.

Figure 18:
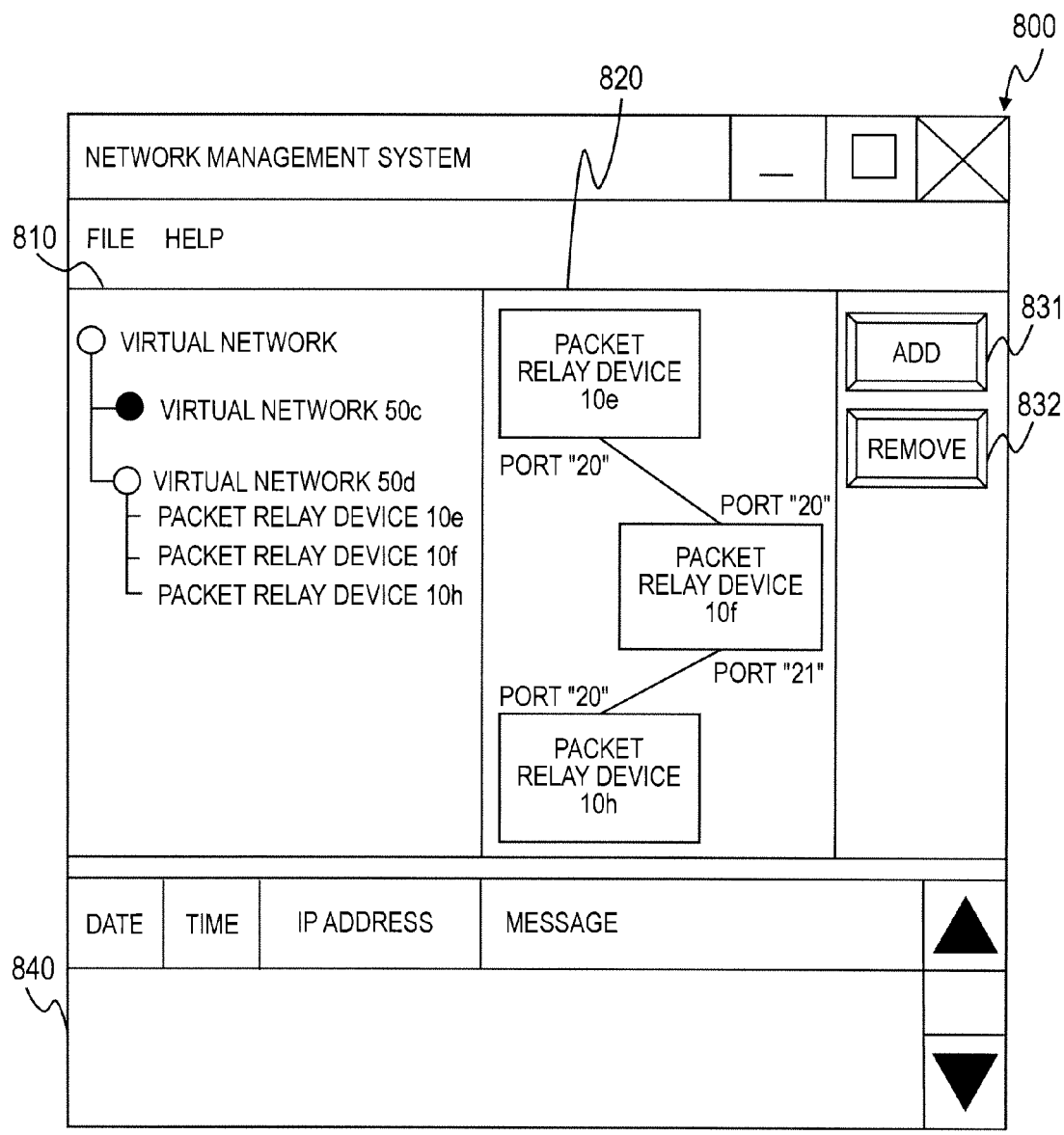
FIG. 18 is an explanatory diagram of the network configuration display screen that is displayed on the display device of the management computer according to the second embodiment of this invention.

FIG. 18 is an explanatory diagram of the network configuration display screen 800 that is displayed on the display device 44 of the management computer 30 according to the second embodiment of this invention.

The network configuration display screen 800 of this embodiment differs from the network configuration display screen 800 of FIG. 6 in that packet transmission/reception port identifiers, instead of VLAN IDs, are displayed in the network topology display area 820.

According to FIG. 15, a virtual network 50*d* is selected in the virtual network list display area 810. The network configuration display screen 800 consequently displays the packet relay devices 10e, 10f, and 10h which belong to the virtual network 50d, and displays that a packet transmission/reception port "20" of the packet relay device 10e and a packet transmission/reception port "20" of the packet relay device 10f are coupled to each other, and that a packet transmission/reception port "21" of the packet relay device 10f and a packet transmission/reception port "20" of the packet relay device 10h are coupled to each other.

A description is given on processing of identifying the packet relay devices 10 that belong to a virtual network selected by the network administrator and processing of identifying a coupling relation between the packet relay devices 10.

First, the virtual network configuration calculating portion 37 refers to the virtual network configuration table 43b of FIG. 17 to obtain an entry in which the identifier of the selected virtual network is registered as the virtual network identifier 431. The virtual network configuration calculating portion 37 then identifies, as the identifiers of the packet relay devices 10 that belong to the selected virtual network, each packet relay device identifier registered as the packet relay device identifier 432 in the obtained entry.

The virtual network configuration calculating portion 37 further identifies that the packet relay devices 10 for which the same packet transmission/reception port identifier is registered as the packet transmission/reception port 435 in the obtained entry are coupled to each other.

This way, virtual packet relay device identifiers are not displayed on the display device 44 even when virtual packet relay devices that constitute a virtual network are not assigned the same virtual packet relay device identifier, and the network administrator can thus check the configurations of the respective virtual networks without needing to be aware of virtual packet relay device identifiers.

Figure 19:
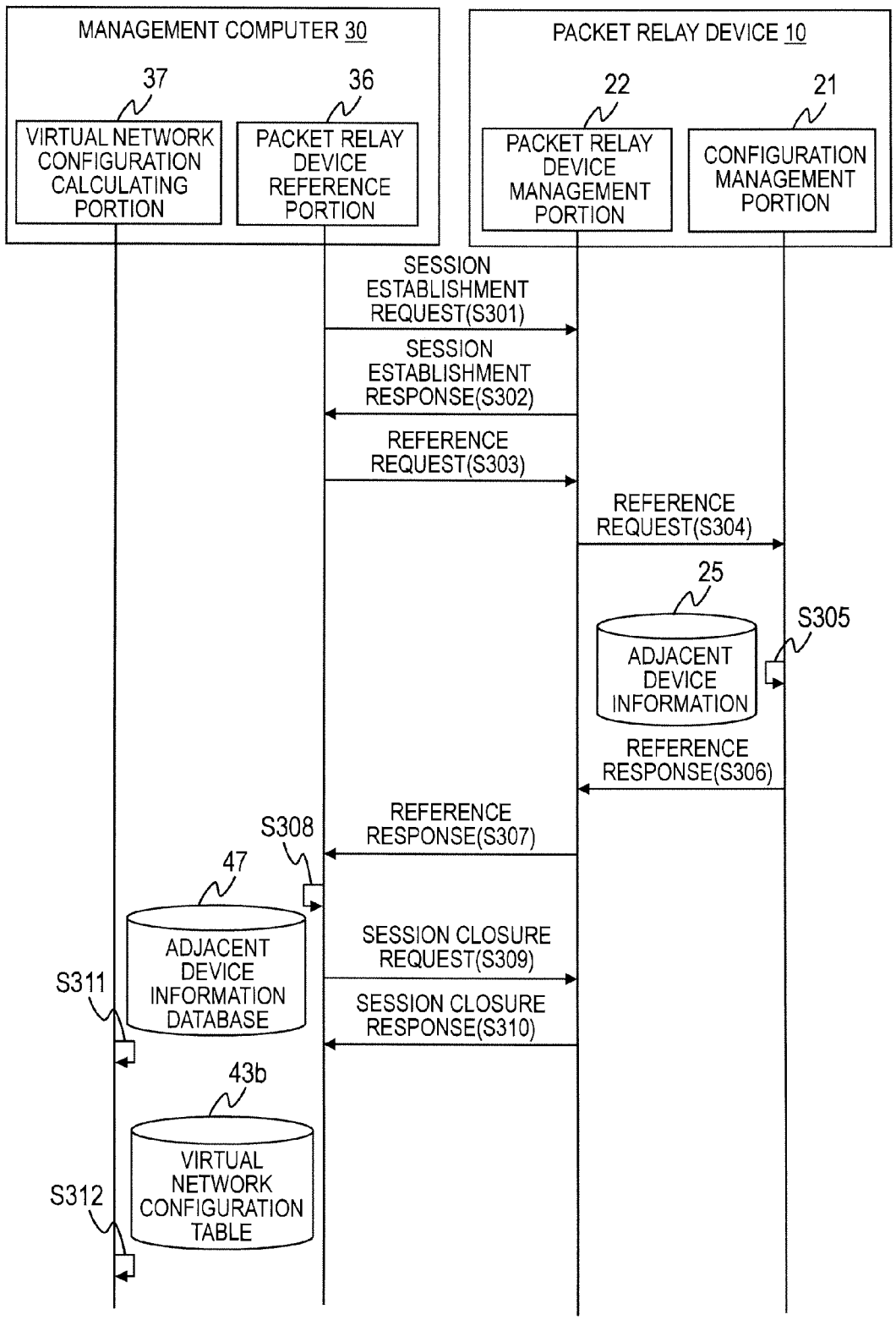
FIG. 19 is a sequence diagram of adjacent device information obtaining processing in which the management computer obtains a adjacent device information from the packet relay devices, according to the second embodiment of this invention.

FIG. 19 is a sequence diagram of adjacent device information obtaining processing in which the management computer 30 obtains the adjacent device information 25 from the packet relay devices 10, according to the second embodiment of this invention.

The adjacent device information obtaining processing is the same as the configuration information obtaining processing of the first embodiment which is illustrated in FIG. 7, except that the management computer 30 obtains the adjacent device information 25 from the packet relay devices 10 and stores the obtained adjacent device information 25 in the adjacent device information database 47.

The packet relay device reference portion 36 of the management computer 30 transmits a session establishment request to the packet relay device management portion 22 of every packet relay device 10 (S301). The processing of S301 corresponds to the processing of S101 of FIG. 7.

In the case where establishing a session is possible, the packet relay device management portion 22 transmits a session establishment response which includes a session identifier to the packet relay device reference portion 36 of the management computer 30 (S302). The processing of S302 corresponds to the processing of S102 of FIG. 7.

Receiving the session establishment response from the packet relay device 10, the packet relay device reference portion 36 of the management computer 30 transmits to this packet relay device 10 an adjacent device information reference request which is a request to obtain the adjacent device information 25 of the packet relay device 10 (S303). The processing of S303 corresponds to the processing of S103 of FIG. 7.

Receiving the adjacent device information reference request from the management computer 30, the packet relay device management portion 22 of the packet relay device 10 hands over the received adjacent device information reference request to the configuration management portion 21 (S304). The processing of S304 corresponds to the processing of S104 of FIG. 7.

Receiving the adjacent device information reference request from the packet relay device management portion 22, the configuration management portion 21 refers to the adjacent device information 25 (S305), obtains the adjacent device information 25, and hands over an adjacent device information reference response which includes the obtained adjacent device information 25 to the packet relay device management portion 22 (S306). The packet relay device management portion 22 transmits the handed over adjacent device information reference response to the packet relay device reference portion 36 of the management computer 30 (S307). The processing of S305 to S307 corresponds to the processing of S105 to S107 of FIG. 7.

Receiving the adjacent device information reference response from the packet relay device 10, the packet relay device reference portion 36 registers in the adjacent device information database 47 the adjacent device information 25 included in the received adjacent device information reference response (S308). The packet relay device reference portion 36 then transmits a session closure request which is a request to close a session to the packet relay device management portion 22 of the packet relay device 10 that has sent the adjacent device information reference response (S309). The processing of S308 and S309 corresponds to the processing of S108 and S109 of FIG. 7.

Receiving the session closure request from the management computer 30, the packet relay device management portion 22 closes the session and transmits a session closure response to the packet relay device reference portion 36 of the management computer 30 (S310). The processing of S310 corresponds to the processing of S110 of FIG. 7.

This concludes the description of a procedure that the management computer 30 follows to obtain the adjacent device information 25 of each packet relay device 10.

Thereafter, the virtual network configuration calculating portion 37 refers to the adjacent device information database 47 (S311) to identify virtual networks constituted of the virtual packet relay devices 20, and registers the virtual packet relay device identifiers of these virtual packet relay devices 20 in the virtual network configuration table 43b in association with virtual network identifiers of the identified virtual networks (S312).

The processing of S311 and S312 is referred to as virtual network identifying processing, and details thereof are described with reference to FIGS. 20A and 20B.

Figure 20A:
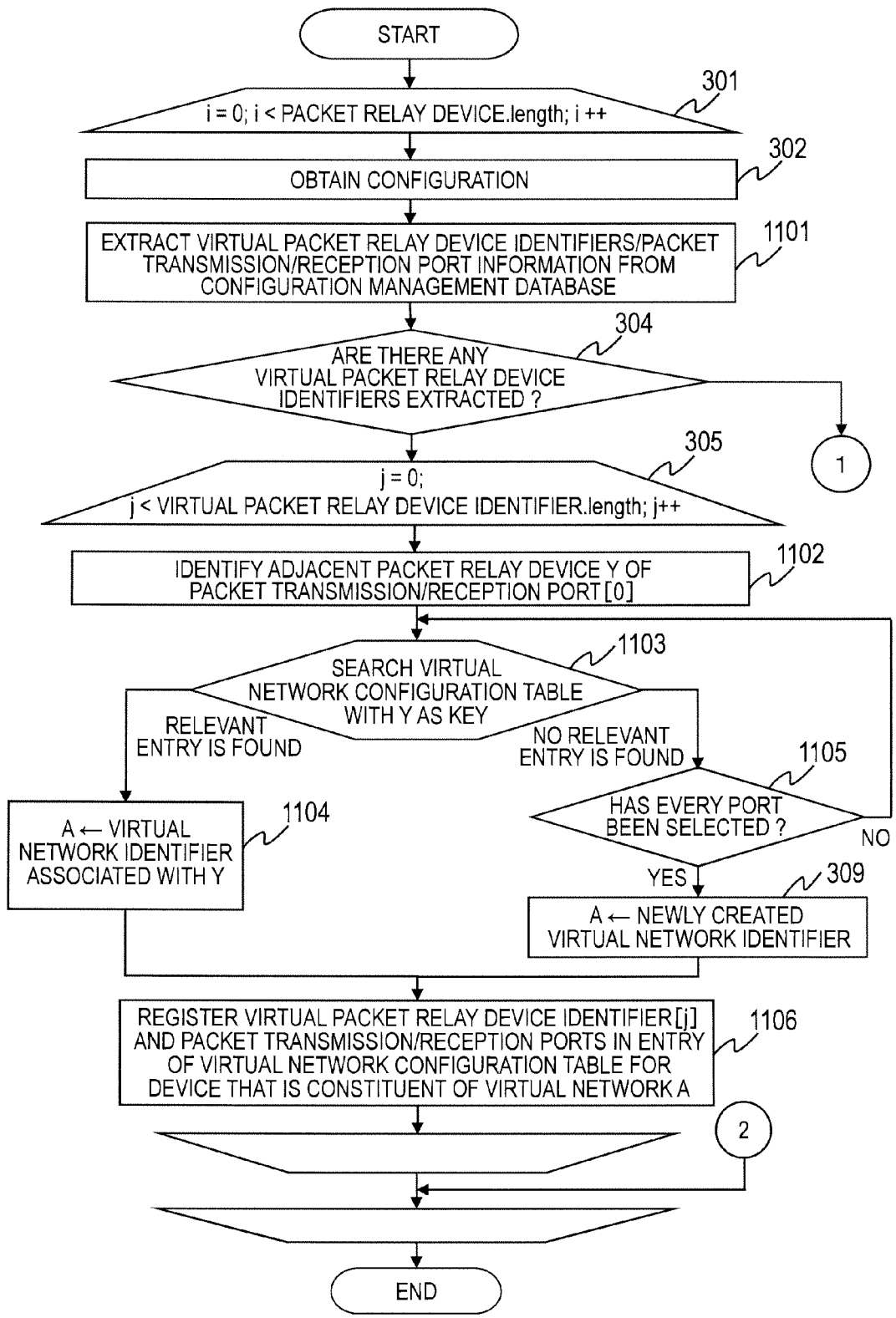
FIG. 20A is a flow chart of virtual network identifying processing that is executed by the virtual network configuration calculating portion according to the second embodiment of this invention.

FIG. 20A is a flow chart of virtual network identifying processing that is executed by the virtual network configuration calculating portion 37 according to the second embodiment of this invention. In FIG. 20A, processing steps that are the same as those in the virtual network identifying processing of FIG. 8A are denoted by the same reference symbols in order to omit their descriptions.

The virtual network configuration calculating portion 37 obtains in Step 302 configuration information of one of the packet relay devices 10 stored in the configuration management database 42b, and then extracts virtual packet relay device identifiers and packet transmission/reception port identifiers from the obtained configuration information (1101).

The virtual network configuration calculating portion 37 selects in Step 305 one of the virtual packet relay device identifiers as a processing target, and then selects as a processing target one of the packet transmission/reception port identifiers of the packet transmission/reception ports 14 that are included in the virtual packet relay device 20 identified by the processing target virtual packet relay device identifier. The virtual network configuration calculating portion 37 subsequently refers to the adjacent device information database 47 to identify the adjacent packet relay device identifier of an adjacent packet relay device Y which is coupled to the packet transmission/reception port 14 identified by the processing target packet transmission/reception port identifier, and the identifier of an adjacent packet transmission/reception port (1102).

The virtual network configuration calculating portion 37 determines whether or not the adjacent packet relay device identifier and adjacent packet transmission/reception port identifier which are identified in Step 1102 are registered in the virtual network configuration table 43*b* (1103).

When it is determined in Step 1103 that the adjacent packet relay device identifier and the adjacent packet transmission/reception port identifier are registered in the virtual network configuration table 43*b*, the virtual network configuration calculating portion 37 refers to the virtual network configuration table 43*b* to set a virtual network identifier that is associated with the adjacent packet relay device identifier and the adjacent packet transmission/reception port identifier as the virtual network identifier of a virtual network whose constituents include the virtual packet relay device 20 identified by the processing target virtual packet relay device identifier (1104).

The virtual network configuration calculating portion 37 registers the virtual network identifier set in Step 1104 in a new entry of the virtual network configuration table 43*b* in association with the processing target virtual packet relay device identifier and all packet transmission/reception port identifiers associated with the processing target virtual packet relay device identifier (1106).

When it is determined in Step 1103 that the adjacent packet relay device identifier and the adjacent packet transmission/reception port identifier are not registered in the virtual network configuration table 43*b*, on the other hand, the virtual network configuration calculating portion 37 determines whether or not the packet transmission/reception port identifier of every packet transmission/reception port 14 that is included in the virtual packet relay device 20 identified by the processing target virtual packet relay device identifier has been selected as a processing target packet transmission/reception port identifier (1105).

When it is determined in Step 1105 that the packet transmission/reception port identifier of every packet transmission/reception port 14 that is included in the virtual packet relay device 20 identified by the processing target virtual packet relay device identifier has been selected as a processing target packet transmission/reception port identifier, the virtual network configuration calculating portion 37 proceeds to Step 309 to generate a new virtual network identifier and set the generated virtual network identifier as the virtual network identifier of a virtual network whose constituents include the virtual packet relay device 20 having the processing target virtual packet relay device identifier.

When it is determined in Step 1105 that the packet transmission/reception port identifier of every packet transmission/reception port 14 that is included in the virtual packet relay device 20 identified by the processing target virtual packet relay device identifier has not been selected as a processing target packet transmission/reception port identifier, on the other hand, the virtual network configuration calculating portion 37 returns to Step 1103 to select a new processing target packet transmission/reception port identifier.

Figure 20B:
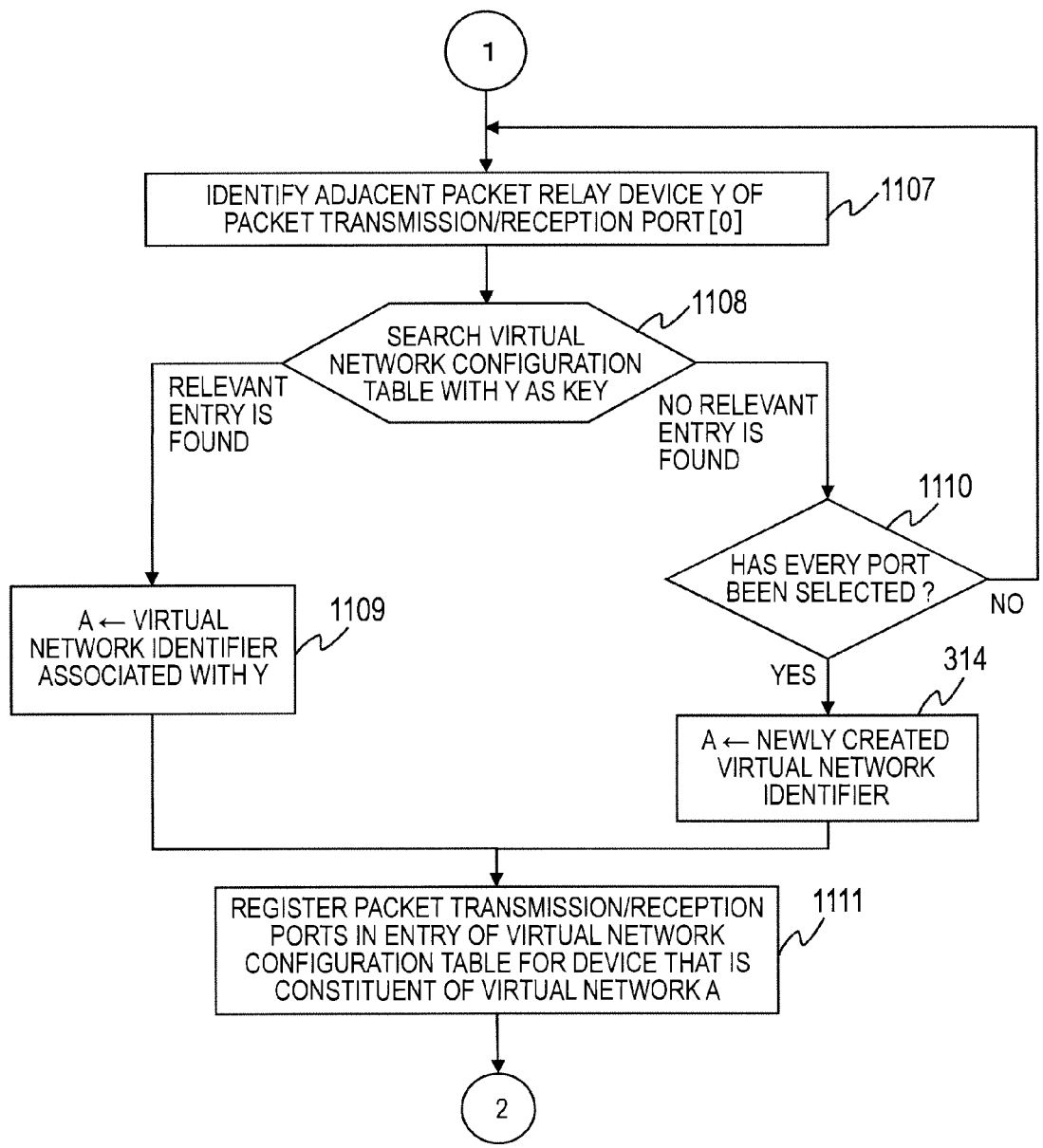
FIG. 20B is a flow chart of virtual network identifying processing according to the second embodiment of this invention.

A description is given next with reference to FIG. 20B on virtual network identifying processing that is executed when it is determined in Step 304 that no virtual packet relay device identifiers have been extracted in Step 1101. FIG. 20B is a flow chart of virtual network identifying processing according to the second embodiment of this invention.

The virtual network configuration calculating portion 37 first selects as a processing target one of the packet transmission/reception port identifiers of the packet transmission/reception ports 14 that are included in the processing target packet relay device 10. The virtual network configuration calculating portion 37 then refers to the adjacent device information database 47 to identify the adjacent packet relay device identifier of the adjacent packet relay device Y which is coupled to the packet transmission/reception port 14 identified by the processing target packet transmission/reception port identifier, and the identifier of an adjacent packet transmission/reception port (1107).

The virtual network configuration calculating portion 37 determines whether or not the adjacent packet relay device identifier and adjacent packet transmission/reception port identifier which are identified in Step 1107 are registered in the virtual network configuration table 43*b* (1108).

When it is determined in Step 1108 that the adjacent packet relay device identifier and the adjacent packet transmission/reception port identifier are registered in the virtual network configuration table 43*b*, the virtual network configuration calculating portion 37 refers to the virtual network configuration table 43*b* to set a virtual network identifier that is associated with the adjacent packet relay device identifier and the adjacent packet transmission/reception port identifier as the virtual network identifier of a virtual network whose constituents include the processing target packet relay device 10 (1109).

The virtual network configuration calculating portion 37 registers the virtual network identifier set in Step 1109 in a new entry of the virtual network configuration table 43*b* in association with the processing target packet relay device identifier and all packet transmission/reception port identifiers associated with the processing target packet relay device identifier (1111).

When it is determined in Step 1108 that the adjacent packet relay device identifier and the adjacent packet transmission/reception port identifier are not registered in the virtual network configuration table 43*b*, on the other hand, the virtual network configuration calculating portion 37 determines whether or not the packet transmission/reception port identifier of every packet transmission/reception port 14 that is included in the packet relay device 10 identified by the processing target packet relay device identifier has been selected as a processing target packet transmission/reception port identifier (1110).

When it is determined in Step 1110 that the packet transmission/reception port identifier of every packet transmission/reception port 14 that is included in the packet relay device 10 identified by the processing target packet relay device identifier has been selected as a processing target packet transmission/reception port identifier, the virtual network configuration calculating portion 37 proceeds to Step 314 to generate a new virtual network identifier and set the generated virtual network identifier as the virtual network identifier of a virtual network whose constituents include the packet relay device 10 having the processing target packet relay device identifier.

When it is determined in Step 1110 that the packet transmission/reception port identifier of every packet transmission/reception port 14 that is included in the packet relay device 10 identified by the processing target packet relay device identifier has not been selected as a processing target packet transmission/reception port identifier, on the other hand, the virtual network configuration calculating portion 37 returns to Step 1107 to select a new processing target packet transmission/reception port identifier.

A more concrete description on the virtual network identifying processing described with reference to FIGS. 20A and 20B is given next, taking as an example the configuration management database 42b of FIG. 15, the adjacent device information database 47 of FIG. 16, and the virtual network configuration table 43b of FIG. 17.

The premise here is that the virtual network configuration calculating portion 37 first obtains in Step 302 configuration information of the packet relay device 10e from the configuration management database 42b. In Step 1101, the virtual network configuration calculating portion 37 extracts from the obtained configuration information "virtual packet relay device identifier: 100, packet transmission/reception port identifier: 10", "100, 11", "200, 20", and "200, 21".

The virtual packet relay device identifiers "100" and "200" have been extracted in Step 1101, and hence the virtual network configuration calculating portion 37 determines in Step 304 that there are virtual packet relay device identifiers extracted, and proceeds to Step 305.

In Step 305, the virtual packet relay device identifier "100" is selected as a processing target virtual packet relay device identifier.

In Step 1105, the virtual network configuration calculating portion 37 next selects the packet transmission/reception port identifier "10" as a processing target packet transmission/reception port identifier. In Step 1102, the virtual network configuration calculating portion 37 identifies an adjacent packet relay device identifier "10f" and adjacent packet transmission/reception port identifier "10" of the packet transmission/reception port identifier "10".

In Step 1103, the virtual network configuration calculating portion 37 determines whether or not the adjacent packet relay device identifier "10f" and the adjacent packet transmission/reception port identifier "10" are registered in the virtual network configuration table 43b.

The adjacent packet relay device identifier "10f" and the adjacent packet transmission/reception port identifier "10" have been registered at this point in the virtual network configuration table 43b in this example (an entry 1003 illustrated in FIG. 17). The entry 1003 has a virtual network identifier "50c".

The virtual network configuration calculating portion 37 then proceeds to Step 1104 to obtain the virtual network identifier "50c" as the virtual network identifier of a virtual network to which the virtual packet relay device "100" of the packet relay device 10e belongs. In Step 1106, the virtual network identifier "50c" is registered in the virtual network configuration table 43b in association with the virtual packet relay device identifier "100" and the packet transmission/reception port identifiers "10" and "11" (entries 1001 and 1002 illustrated in FIG. 17).

The virtual network configuration calculating portion 37 executes the processing described above for the virtual packet relay device identifier "200" of the packet relay device 10e as well. In this case, the adjacent device information database 47 of FIG. 16 is referred to and reveals that the adjacent packet relay device 10f and the adjacent packet transmission/reception port identifier "20" are coupled to the packet transmission/reception port "20" of the packet relay device 10e. The virtual network configuration table 43b of FIG. 17 associates the adjacent packet relay device 10f and the adjacent packet transmission/reception port identifier "20" with a virtual network identifier "50d". The virtual network identifier "50d" is consequently registered in the virtual network configuration table 43b in association with the virtual packet relay device identifier "200" and the packet transmission/reception port identifiers "20" and "21" (entries 1005 and 1006 illustrated in FIG. 17).

It is premised here that the virtual network configuration calculating portion 37 next obtains in Step 302 configuration information of the packet relay device 10h from the configuration management database 42b. No virtual packet relay device identifiers are registered in the configuration information (the packet transmission/reception port identifier "20") of the packet relay device 10h, and the virtual network configuration calculating portion 37 therefore proceeds to Step 1107.

In Step 1107, the virtual network configuration calculating portion 37 refers to the adjacent device information database 47 to identify that the adjacent packet transmission/reception port "21" of the adjacent packet relay device 10f is coupled to the packet transmission/reception port "20" of the packet relay device 10h.

The virtual network configuration calculating portion 37 next determines in Step 1108 whether or not the adjacent packet transmission/reception port identifier "21" of the adjacent packet relay device identifier "10f" is registered in the virtual network configuration table 43b.

The adjacent packet transmission/reception port identifier "21" of the adjacent packet relay device identifier "10f" has been registered at this point in the virtual network configuration table 43b in this example (an entry 1008 illustrated in FIG. 17).

The virtual network configuration calculating portion 37 obtains in Step 1109 the virtual network identifier "50d" of the entry 1008 of FIG. 17 as the virtual network identifier of a virtual network to which the packet relay device 10h belongs.

In Step 1111, the virtual network identifier "50d" is registered in the virtual network configuration table 43b in association with the packet transmission/reception port identifier "20" of the packet relay device 10h (1009).

The virtual network configuration table 43b of FIG. 17 is generated by repeating the processing described above as many times as the number of the packet relay devices 10 managed by the management computer 30.

Figure 21:
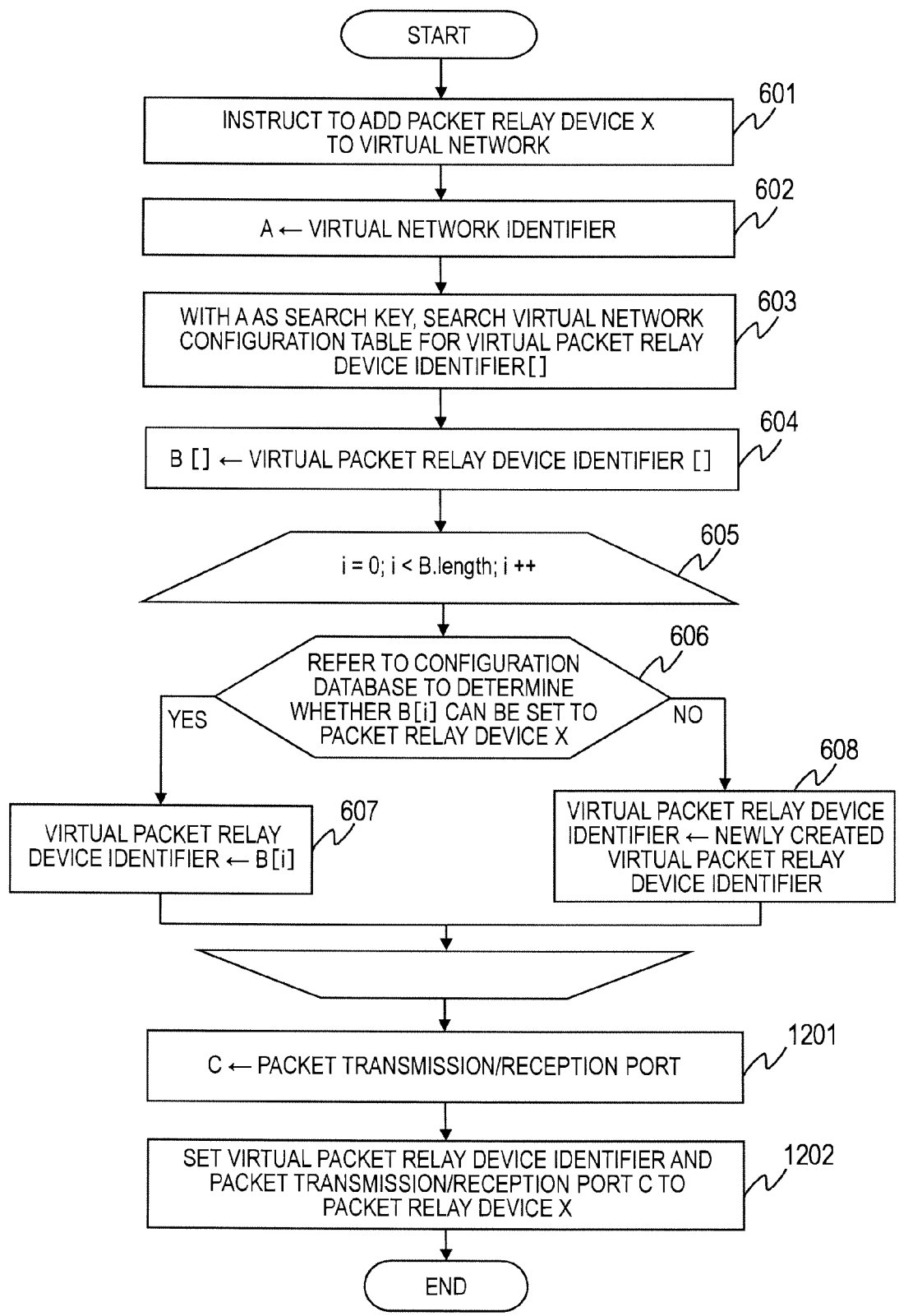
FIG. 21 is a flow chart of configuration information determining processing according to the second embodiment of this invention.

FIG. 21 is a flow chart of configuration information determining processing according to the second embodiment of this invention. In FIG. 21, processing steps that are the same as those in the configuration information determining processing of the first embodiment which is illustrated in FIG. 10 are denoted by the same reference symbols in order to omit their descriptions.

In the configuration information determining processing of this embodiment, processing steps up through the determination of a virtual packet relay device identifier (Steps 601 to 608) are the same as in the configuration information determining processing of the first embodiment which is illustrated in FIG. 10. The addition instruction in the second embodiment includes the identifier (coupling source packet transmission/reception port identifier) of the packet transmission/reception port 14 (coupling source packet transmission/reception port) that is coupled to the coupling destination packet relay device of the new packet relay device X to be added as well.

The coupling source packet transmission/reception port identifier is the packet transmission/reception port identifier of the packet transmission/reception port 14 of the new packet relay device 10 to be added that has been selected in the network topology display area 820 when the "add" button 831 is operated.

After executing Steps 606 to 608 for every virtual packet relay device identifier stored in the array in Step 604, the configuration generating portion 39 obtains the coupling source packet transmission/reception port identifier included in the addition instruction (1201), and associates the virtual packet relay device identifier determined in Step 607 or 608 as an identifier to be allocated to a virtual packet relay device that is newly generated in the packet relay device X with the obtained coupling source packet transmission/reception port identifier.

The configuration generating portion 39 next inputs to the packet relay device setting portion 38 a setting request for setting the virtual packet relay device identifier determined in Step 607 or 608 and the coupling source packet transmission/reception port identifier obtained in Step 1201 in the configuration information of the packet relay device X (1202). The configuration information determining processing is then ended.

In the manner described above, a new packet relay device 10 is added to a virtual network by making the management computer 30 set virtual packet relay device identifiers instead of the network administrator. The network administrator can thus construct a virtual network without needing to be aware of virtual packet relay device identifiers.

The embodiments disclosed herein are examples in every sense and are not to be construed as restrictive. The scope of this invention is defined not by the meanings described above but by the following scope of patent claims, and is intended to encompass meanings equivalent to the scope of patent claims and all modifications within the scope.

What is claimed is:

1. A network management system for managing a plurality of packet relay devices, the network management system comprising:
the plurality of packet relay devices constituting networks; and
a display device for displaying configurations of the networks,
wherein each of the plurality of packet relay devices can generate at least one virtual packet relay device,
wherein the virtual packet relay devices generated in the plurality of packet relay devices constitute a plurality of virtual first networks,
wherein each of the virtual packet relay devices is assigned a virtual packet relay device identifier unique throughout the packet relay device in which the each of the virtual packet relay devices is generated,
wherein each of the plurality of virtual first networks can be divided into at least one virtual second network,
wherein the each of the plurality of packet relay devices manages, as configuration information, the virtual packet relay device identifier assigned to the each of the plurality of packet relay devices and a second-network identifier which is an identifier of the at least one virtual second network,
wherein the network management system further comprises:
a configuration information obtaining module which obtains the configuration information from the each of the plurality of packet relay devices and stores the obtained configuration information in a configuration information management table;
a first-network identifying module which, in a case where the configuration information obtaining module obtains the configuration information from the each of the plurality of packet relay devices, identifies the virtual first network to which the virtual packet relay device identifier included in the obtained configuration information belongs, and registers the obtained configuration information in a first-network configuration table in association with a first network identifier that is an identifier of the identified virtual first network; and
a network configuration display module which, in a case where a display request to display a configuration of given one of the plurality of virtual first networks is received, refers to the first-network configuration table and displays the configuration of the given one of the plurality of virtual first networks on the display device,
wherein the first-network identifying module is configured to:
in a case where the configuration information obtaining module obtains the configuration information from the each of the plurality of packet relay devices, extract the virtual packet relay device identifier and the second-network identifier from the obtained configuration information;
determine whether or not the virtual packet relay device identifier of the virtual packet relay device that is assigned the second-network identifier associated with the extracted second-network identifier is registered in the first-network configuration table;
in a case where it is determined that the virtual packet relay device identifier of the virtual packet relay device that is assigned the second-network identifier associated with the extracted second-network identifier is not registered in the first-network configuration table, generate a new first-network identifier and register the generated new first-network identifier in the first-network configuration table in association with the obtained configuration information; and
in a case where it is determined that the virtual packet relay device identifier of the virtual packet relay device that is assigned the second-network identifier associated with the extracted second-network identifier is registered in the first-network configuration table, associate the first-network identifier that is associated with the virtual packet relay device identifier with the obtained configuration information, and register the association between the first-network identifier and the obtained configuration information in the first-network configuration table, and
wherein, in a case of receiving the display request, the network configuration display module refers to the first-network configuration table and identifies the virtual packet relay device identifier that is associated with the first-network identifier of the given one of the plurality of virtual first networks, to thereby identify the configuration of the given one of the plurality of virtual first networks and display the identified configuration of the given one of the plurality of virtual first networks on the display device.

2. The network management system according to claim 1, wherein the each of the plurality of virtual first networks can be divided into at least one VLAN, which is the at least one virtual second network, by a VLAN identifier assigned to the virtual packet relay device as the second-network identifier, and wherein the first-network identifying module identifies the second-network identifier that is the same as the extracted second-network identifier as the second network identifier associated with the extracted second-network identifier.

3. The network management system according to claim 1, wherein the each of the plurality of packet relay devices includes ports which are each coupled to another packet relay device and which are associated with the virtual packet relay devices, wherein each of the ports is assigned a port identifier for identifying the each of the ports as the second-network identifier, wherein the each of the plurality of virtual first networks can be divided into the at least one virtual second network by coupling the ports to each other and thus coupling the virtual packet relay devices associated with the ports to each other, wherein the network management system holds, in an adjacent relation table, a relation among the port identifier of the each of the plurality of packet relay devices, an adjacent port identifier that is an identifier of an adjacent port coupled to the port identified by the port identifier, and an adjacent packet relay device identifier that is an identifier of an adjacent packet relay device including the adjacent port, and wherein the first-network identifying module refers to the adjacent relation table to identify the adjacent port identifier associated with the port identifier that is the extracted second-network identifier, and sets the identified adjacent port identifier as the second-network identifier associated with the extracted second-network identifier.

4. The network management system according to claim 1, further comprising:

a packet relay device setting module which sets the configuration information of the plurality of packet relay devices; and a configuration information generating module which, in a case of receiving a setting request for adding one of the plurality of packet relay devices to the given one of the plurality of virtual first networks, generates the virtual packet relay device identifier of the virtual packet relay device that is generated in the one of the plurality of packet relay devices to be added, wherein the setting request includes the first-network identifier of the given one of the plurality of virtual first networks to which the one of the plurality of packet relay devices is added, wherein the configuration information generating module is configured to:

in a case of receiving the setting request, refer to the first-network configuration table to obtain the virtual packet relay device identifier that is associated with the first-network identifier included in the setting request;

refer to the configuration information management table to determine whether or not the obtained virtual packet relay device identifier can be assigned to the one of the plurality of packet relay devices to be added;

in a case where it is determined that the obtained virtual packet relay device identifier can be assigned to the one of the plurality of packet relay devices to be added, determine that the obtained virtual packet relay device identifier is to be allocated to the virtual packet relay device generated in the one of the plurality of packet relay devices to be added; and in a case where it is determined that the obtained virtual packet relay device identifier cannot be assigned to the one of the plurality of packet relay devices to be added, determine that a virtual packet relay device identifier that is not the obtained virtual packet relay device identifier is to be allocated to the virtual packet relay device generated in the one of the plurality of packet relay devices to be added, and wherein the packet relay device setting module sets the configuration information of the one of the plurality of packet relay devices to be added in a manner that allocates the virtual packet relay device identifier determined by the configuration information generating module to the virtual packet relay device generated in the one of the plurality of packet relay devices to be added.

5. The network management system according to claim 4, wherein the each of the plurality of virtual first networks can be divided into at least one VLAN, which is the at least one virtual second network, by a VLAN identifier assigned to the virtual packet relay device as the second-network identifier, wherein the VLAN identifier is assigned in association with ports included in the plurality of packet relay devices, wherein the setting request includes a coupling destination port identifier of a coupling destination port to which the one of the plurality of packet relay devices to be added is coupled, and a coupling destination packet relay device identifier of a coupling destination packet relay device which includes the coupling destination port, wherein the configuration information generating module is configured to:

in a case of receiving the setting request, refer to the configuration information management table to obtain the VLAN identifier assigned to the port that is identified by the coupling destination port identifier included in the setting request; and determine that the obtained VLAN identifier is to be assigned to a coupling source port which is one of the ports included in the one of the plurality of packet relay devices to be added and which is coupled to the coupling destination port, and wherein the packet relay device setting module sets the configuration information of the one of the plurality of packet relay devices to be added in a manner that assigns the VLAN identifier determined by the configuration information generating module to the coupling source port.

6. The network management system according to claim 1, wherein the each of the plurality of virtual first networks can be divided into at least one VLAN, which is the at least one virtual second network, by a VLAN identifier assigned to the virtual packet relay device as the second-network identifier, wherein the network management system further comprises a VLAN setting module which, in a case of receiving a VLAN setting request for setting the VLAN identifier to a setting target virtual packet relay device that belongs to a setting target virtual first network, sets the configuration information of one of the plurality of packet relay devices in which the setting target virtual packet relay device is generated in a manner that sets the VLAN identifier requested to be set to the setting target virtual packet relay device, and wherein the VLAN setting module is configured to:
- refer to the first-network configuration table to determine whether or not the VLAN identifier that is the same as the VLAN identifier requested to be set has been set to the virtual packet relay device that belongs to another first virtual network that is different from the setting target virtual first network;
- in a case where it is determined that the VLAN identifier that is the same as the VLAN identifier requested to be set has not been set to the virtual packet relay device that belongs to the another virtual first network that is different from the setting target first virtual network, set the configuration information of the packet relay device in which the setting target virtual packet relay device is generated in a manner that sets the VLAN identifier requested to be set to the setting target virtual packet relay device; and
- in a case where it is determined that the VLAN identifier that is the same as the VLAN identifier requested to be set has been set to the virtual packet relay device that belongs to the another virtual first network that is different from the setting target virtual first network, stop setting the configuration information of the packet relay device in which the setting target virtual packet relay device is generated.

7. A management computer to be coupled to a plurality of packet relay devices constituting networks, for managing the plurality of packet relay devices, each of the plurality of packet relay devices being able to generate at least one virtual packet relay device, the virtual packet relay devices generated in the plurality of packet relay devices constituting a plurality of virtual first networks, each of the virtual packet relay devices being assigned a virtual packet relay device identifier unique throughout the packet relay device in which the each of the virtual packet relay devices is generated, each of the plurality of virtual first networks being able to be divided into at least one virtual second network, the each of the plurality of packet relay devices managing, as configuration information, the virtual packet relay device identifier assigned to the each of the plurality of packet relay devices and a second-network identifier which is an identifier of the at least one virtual second network, the management computer comprising:
- a configuration information obtaining module which obtains the configuration information from the each of the plurality of packet relay devices and stores the obtained configuration information in a configuration information management table;
- a first-network identifying module which, in a case where the configuration information obtaining module obtains the configuration information from the each of the plurality of packet relay devices, identifies the virtual first network to which the virtual packet relay device identifier included in the obtained configuration information belongs, and registers the obtained configuration information in a first-network configuration table in association with a first network identifier that is an identifier of the identified virtual first network; and
- a network configuration display module which, in a case where a display request to display a configuration of given one of the plurality of virtual first networks is received, refers to the first-network configuration table and generates display data for displaying the configuration of the given one of the plurality of virtual first networks on a display device coupled to the management computer, wherein the first-network identifying module is configured to:
- in a case where the configuration information obtaining module obtains the configuration information from the each of the plurality of packet relay devices, extract the virtual packet relay device identifier and the second-network identifier from the obtained configuration information;
- determine whether or not the virtual packet relay device identifier of the virtual packet relay device that is assigned the second-network identifier associated with the extracted second-network identifier is registered in the first-network configuration table;
- in a case where it is determined that the virtual packet relay device identifier of the virtual packet relay device that is assigned the second-network identifier associated with the extracted second-network identifier is not registered in the first-network configuration table, generate a new first-network identifier and register the generated new first-network identifier in the first-network configuration table in association with the obtained configuration information; and
- in a case where it is determined that the virtual packet relay device identifier of the virtual packet relay device that is assigned the second-network identifier associated with the extracted second-network identifier is registered in the first-network configuration table, associate the first-network identifier that is associated with the virtual packet relay device identifier with the obtained configuration information, and register the association between the first-network identifier and the obtained configuration information in the first-network configuration table, and wherein, in a case of receiving the display request, the network configuration display module refers to the first-network configuration table and identifies the virtual packet relay device identifier that is associated with the first-network identifier of the given one of the plurality of virtual first networks, to thereby identify the configuration of the given one of the plurality of virtual first networks and generate the display data for displaying the identified configuration of the given one of the plurality of virtual first networks.

8. The management computer according to claim 7, wherein the each of the plurality of virtual first networks can be divided into at least one VLAN, which is the at least one virtual second network, by a VLAN identifier assigned to the virtual packet relay device as the second-network identifier, and wherein the first-network identifying module identifies the second-network identifier that is the same as the extracted second-network identifier as the second network identifier associated with the extracted second-network identifier.

9. The management computer according to claim 7, wherein the each of the plurality of packet relay devices includes ports which are each coupled to another packet relay device and which are associated with the virtual packet relay devices, wherein each of the ports is assigned a port identifier for identifying the each of the ports as the second-network identifier, wherein the each of the plurality of virtual first networks can be divided into the at least one virtual second network by coupling the ports to each other and thus coupling the virtual packet relay devices associated with the ports to each other, wherein the management computer holds, in an adjacent relation table, a relation among the port identifier of the each of the plurality of packet relay devices, an adjacent port identifier that is an identifier of an adjacent port coupled to the port identified by the port identifier, and an adjacent packet relay device identifier that is an identifier of an adjacent packet relay device including the adjacent port, and wherein the first-network identifying module refers to the adjacent relation table to identify the adjacent port identifier associated with the port identifier that is the extracted second-network identifier, and sets the identified adjacent port identifier as the second-network identifier associated with the extracted second-network identifier.

10. The management computer according to claim 7, further comprising:

a packet relay device setting module which sets the configuration information of the plurality of packet relay devices; and a configuration information generating module which, in a case of receiving a setting request for adding one of the plurality of packet relay devices to the given one of the plurality of virtual first networks, generates the virtual packet relay device identifier of the virtual packet relay device that is generated in the one of the plurality of packet relay devices to be added, wherein the setting request includes the first-network identifier of the given one of the plurality of virtual first networks to which the one of the plurality of packet relay devices is added, wherein the configuration information generating module is configured to:

in a case of receiving the setting request, refer to the first-network configuration table to obtain the virtual packet relay device identifier that is associated with the first-network identifier included in the setting request;

refer to the configuration information management table to determine whether or not the obtained virtual packet relay device identifier can be assigned to the one of the plurality of packet relay devices to be added;

in a case where it is determined that the obtained virtual packet relay device identifier can be assigned to the one of the plurality of packet relay devices to be added, determine that the obtained virtual packet relay device identifier is to be allocated to the virtual packet relay device generated in the one of the plurality of packet relay devices to be added; and in a case where it is determined that the obtained virtual packet relay device identifier cannot be assigned to the one of the plurality of packet relay devices to be added, determine that a virtual packet relay device identifier that is not the obtained virtual packet relay device identifier is to be allocated to the virtual packet relay device generated in the one of the plurality of packet relay devices to be added, and wherein the packet relay device setting module sets the configuration information of the one of the plurality of packet relay devices to be added in a manner that allocates the virtual packet relay device identifier determined by the configuration information generating module to the virtual packet relay device generated in the one of the plurality of packet relay devices to be added.

11. The management computer according to claim 10, wherein the each of the plurality of virtual first networks can be divided into at least one VLAN, which is the at least one virtual second network, by a VLAN identifier assigned to the virtual packet relay device as the second-network identifier, wherein the VLAN identifier is assigned in association with ports included in the plurality of packet relay devices, wherein the setting request includes a coupling destination port identifier of a coupling destination port to which the one of the plurality of packet relay devices to be added is coupled, and a coupling destination packet relay device identifier of a coupling destination packet relay device which includes the coupling destination port, wherein the configuration information generating module is configured to:

in a case of receiving the setting request, refer to the configuration information management table to obtain the VLAN identifier assigned to the port that is identified by the coupling destination port identifier included in the setting request; and determine that the obtained VLAN identifier is to be assigned to a coupling source port which is one of the ports included in the one of the plurality of packet relay devices to be added and which is coupled to the coupling destination port, and wherein the packet relay device setting module sets the configuration information of the one of the plurality of packet relay devices to be added in a manner that assigns the VLAN identifier determined by the configuration information generating module to the coupling source port.

12. The management computer according to claim 7, wherein the each of the plurality of virtual first networks can be divided into at least one VLAN, which is the at least one virtual second network, by a VLAN identifier assigned to the virtual packet relay device as the second-network identifier, wherein the management computer further comprises a VLAN setting module which, in a case of receiving a VLAN setting request for setting the VLAN identifier to a setting target virtual packet relay device that belongs to a setting target virtual first network, the VLAN identifier being the second-network identifier assigned to the setting target virtual packet relay device, sets configuration information of one of the plurality of packet relay devices in which the setting target virtual packet relay device is generated in a manner that sets the VLAN identifier requested to be set to the setting target virtual packet relay device, and wherein the VLAN setting module is configured to:

refer to the first-network configuration table to determine whether or not the VLAN identifier that is the same as the VLAN identifier requested to be set has been set to the virtual packet relay device that belongs to another first virtual network that is different from the setting target virtual first network;

in a case where it is determined that the VLAN identifier that is the same as the VLAN identifier requested to be set has not been set to the virtual packet relay device that belongs to the another virtual first network that is different from the setting target first virtual network, set the configuration information of the packet relay device in which the setting target virtual packet relay device is generated in a manner that sets the VLAN identifier requested to be set to the setting target virtual packet relay device; and in a case where it is determined that the VLAN identifier that is the same as the VLAN identifier requested to be set has been set to the virtual packet relay device that belongs to the another virtual first network that is different from the setting target virtual first network, stop setting the configuration information of the packet relay device in which the setting target virtual packet relay device is generated.

* * * * *